US012601994B2

(12) United States Patent
An et al.

(10) Patent No.: US 12,601,994 B2
(45) Date of Patent: Apr. 14, 2026

(54) IMAGE FORMING APPARATUS

(71) Applicant: CANON KABUSHIKI KAISHA, Tokyo (JP)

(72) Inventors: Koji An, Saitama (JP); Shinji Katagiri, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/669,028

(22) Filed: May 20, 2024

(65) Prior Publication Data

US 2024/0302771 A1 Sep. 12, 2024

Related U.S. Application Data

(62) Division of application No. 18/223,161, filed on Jul. 18, 2023, now Pat. No. 12,019,382, which is a (Continued)

(30) Foreign Application Priority Data

Jun. 14, 2021 (JP) ................................ 2021-099072
Mar. 25, 2022 (JP) ................................ 2022-050956

(51) Int. Cl.
*G03G 15/16* (2006.01)
*G03G 15/00* (2006.01)
*G03G 15/04* (2006.01)

(52) U.S. Cl.
CPC ... *G03G 15/1675* (2013.01); *G03G 15/04072* (2013.01); *G03G 15/5045* (2013.01); (Continued)

(58) Field of Classification Search
CPC ......... G03G 15/1675; G03G 15/04072; G03G 15/5045; G03G 2215/0404; G03G 2215/1614
See application file for complete search history.

(56) References Cited

U.S. PATENT DOCUMENTS 5,918,086 A 6/1999 Nakano et al.
6,044,236 A 3/2000 Katoh et al.
(Continued)

FOREIGN PATENT DOCUMENTS

JP 04-335383 A 11/1992
JP 10-268674 A 10/1998
(Continued)

OTHER PUBLICATIONS

Office Action dated Mar. 3, 2026, in Japanese Patent Application No. 2022-0513956.

*Primary Examiner* — David J Bolduc
(74) *Attorney, Agent, or Firm* — Venable LLP

(57) ABSTRACT

An image forming apparatus includes an image bearing member, a transfer member, an acquiring portion, an applying portion, and a controller. When a transfer voltage is subjected to constant-voltage control so that the transfer voltage applied to the transfer member by the applying portion is substantially constant, in a case that the transfer voltage, when a toner amount used for a toner image is a first toner amount, is a first voltage, the controller controls the applying portion so that the transfer voltage is a second voltage lower in absolute value than the first voltage in a case that the toner amount is a second toner amount greater than the first toner amount. The acquiring portion acquires toner amount information on the toner amount for each toner image transferred onto a single recording material.

3 Claims, 13 Drawing Sheets

Related U.S. Application Data division of application No. 17/837,278, filed on Jun. 10, 2022, now Pat. No. 11,747,754.

(52) U.S. Cl.
CPC ............... *G03G 2215/0404* (2013.01); *G03G 2215/1614* (2013.01)

(56) References Cited

U.S. PATENT DOCUMENTS

| | | | | |
|---|---|---|---|---|
| 8,718,501 | B2 | 5/2014 | Aoki | |
| 2004/0061666 | A1* | 4/2004 | Noguchi | G03G 21/00 345/30 |
| 2005/0074249 | A1 | 4/2005 | Nishimura | |
| 2005/0141912 | A1* | 6/2005 | Iwakura | G03G 15/1675 399/66 |
| 2006/0285865 | A1 | 12/2006 | Shim | |
| 2008/0118259 | A1 | 5/2008 | Yamada | |
| 2008/0187375 | A1 | 8/2008 | Tomizawa | |
| 2009/0041487 | A1 | 2/2009 | Shida | |
| 2009/0263149 | A1* | 10/2009 | Makino | G03G 15/1675 399/44 |
| 2010/0008682 | A1 | 1/2010 | Lee et al. | |
| 2010/0209128 | A1* | 8/2010 | Sueoka | G03G 15/0194 399/66 |
| 2010/0322652 | A1 | 12/2010 | Torimaru | |
| 2012/0063795 | A1 | 3/2012 | Funatani | |
| 2013/0188981 | A1 | 7/2013 | Horiguchi et al. | |
| 2013/0195519 | A1 | 8/2013 | Ito et al. | |
| 2014/0255050 | A1 | 9/2014 | Yoshida et al. | |
| 2014/0270819 | A1 | 9/2014 | Wada et al. | |
| 2015/0378283 | A1 | 12/2015 | Takahashi | |
| 2016/0041510 | A1 | 2/2016 | Kojima et al. | |
| 2016/0274503 | A1 | 9/2016 | Sugiura et al. | |
| 2017/0108804 | A1 | 4/2017 | Nagata | |
| 2017/0277120 | A1* | 9/2017 | Miyoshi | G03G 15/1605 |
| 2017/0315488 | A1 | 11/2017 | Kitabayashi | |
| 2018/0004114 | A1* | 1/2018 | Nagaya | G03G 21/16 |
| 2019/0137918 | A1 | 5/2019 | Matsuda | |
| 2020/0041955 | A1 | 2/2020 | Nakai et al. | |
| 2020/0050133 | A1* | 2/2020 | Ohta | G03G 15/1605 |
| 2020/0089146 | A1 | 3/2020 | Yamada | |
| 2020/0209786 | A1 | 7/2020 | Kato | |
| 2020/0285176 | A1 | 9/2020 | Sueoka | |
| 2021/0311418 | A1 | 10/2021 | Omata | |
| 2022/0308505 | A1 | 9/2022 | Kobayashi | |
| 2022/0357693 | A1 | 11/2022 | Kobayashi | |

FOREIGN PATENT DOCUMENTS

| | | | |
|---|---|---|---|
| JP | 2002-072576 | A | 3/2002 |
| JP | 2010-191088 | A | 9/2010 |
| JP | 2011-227174 | A | 11/2011 |
| JP | 2012-063445 | A | 3/2012 |
| JP | 2013-217958 | A | 10/2013 |
| KR | 10-0423009 | B1 | 4/2005 |

* cited by examiner

IMAGE FORMING APPARATUS

FIELD OF THE INVENTION AND RELATED ART

The present invention relates to an image forming apparatus, such as a printer, a copying machine, or a facsimile machine, of an electrophotographic type or an electrostatic recording type.

In the image forming apparatus of the electrophotographic type, a toner image formed on an image bearing member is transferred onto a recording material such as paper passing through a transfer portion formed between the image bearing member and the transfer member.

In an image forming apparatus of an intermediary transfer type, a toner image formed on a photosensitive member or the like as a first image bearing member is primary-transferred onto an intermediary transfer member as a second image bearing member and thereafter is secondary-transferred onto the recording material passing through a secondary transfer portion formed between the intermediary transfer member and a secondary transfer member.

The transfer of the toner image from the image bearing member onto the recording material is carried out by applying a transfer voltage to the transfer member. In order to obtain a high-quality product (print), it is important to apply an appropriate transfer voltage.

In Japanese Laid-Open Patent Application (JP-A) 2010-191088, a constitution in which in order to obtain a uniform final image irrespective of an image pattern or a print ratio, a transfer current is changed depending on the print ratio or the number of pixels is disclosed. In this constitution, control such that a transfer current amount is increased with an increase in print ratio or the number of pixels, i.e., an increasing toner amount of toner transferred onto the recording material is carried out, so that improper transfer in a high print-ratio image is intended to be suppressed.

However, as in the constitution disclosed in JP-A 2010-191088, when control such that the transfer current is increased with the increasing toner amount of the toner transferred onto the recording material is carried out, there is a possibility that the following two kinds of image defects occur.

(1) Case where Low Print-Ratio Image Including Isolated Patch Pattern or the Like is Transferred In general, in a high-temperature/high-humidity environment, an electric resistance value of the transfer member, such as a transfer roller, or the recording material lowers. For that reason, a transfer current is liable to selectively flow through a portion where toner which has a low resistance (low electric resistance value) does not exist (hereinafter, referred to as a "white portion" (or "white background portion")), not a portion where toner which has a high resistance (high electric resistance value) exists (hereinafter, referred to as a "toner portion" (or "primary transfer portion")). For that reason, in order to satisfactorily transfer an isolated patch pattern, there is a need that the transfer current is caused to flow in a large amount. Here, the "isolated patch pattern" means an image pattern such that a cluster of high-print-ratio toner images is interspersed in a region of a width (length in a widthwise direction substantially perpendicular to a feeding direction) of the recording material. However, in the constitution of JP-A 2010-191088, in the image including the isolated patch pattern, discrimination that a toner amount is small is made, and therefore, an absolute value of the transfer voltage is decreased. As a result, a sufficient transfer current cannot be supplied to the toner portion, so that there is a possibility of an occurrence of an image defect such that toner which is not transferred onto the recording material generates (hereinafter, referred to also as "patch void").

(2) Case where High Print-Ratio Image Including Overall Solid Image or the Like is Transferred In this case, the transfer current does not selectively flow through the white background portion, and therefore, the transfer current is sufficiently supplied to the toner portion. In the case where the transfer voltage is set so that the transfer current is sufficiently supplied to the isolated patch pattern, to the overall solid image, the transfer current of not less than a minimum current necessary to transfer the toner (image) is supplied. Here, the "overall solid image" ("overall solid pattern)" means an image pattern such that a toner image with a highest density level exists in the entirety of an image formable region with respect to the widthwise direction. However, in the constitution of JP-A 2010-191088, the transfer voltage is further increased in absolute value than the transfer voltage necessary to transfer the "overall solid image" ("overall solid pattern)". As a result, an excessive transfer current is supplied to the toner portion, so that there is a possibility of an occurrence of an image defect such that toner which is not transferred onto the recording material due to inversion of a charge polarity by electric discharging generates (hereinafter, referred to also as "toner").

SUMMARY OF THE INVENTION

A principal object of the present invention is to provide an image forming apparatus capable of setting an appropriate transfer voltage even under an environment, such as a high-temperature/high-humidity environment, in which it is difficult to compatibly realize suppression of the patch void and suppression of the insufficient transfer.

According to an aspect of the present invention, there is provided an image forming apparatus comprising: an image bearing member configured to bear a toner image; a transfer member configured to form a transfer portion where the toner image is transferred from the image bearing member onto a recording material; an acquiring portion configured to acquire toner amount information on a toner amount; an applying portion configured to apply a transfer voltage to the transfer member; and a controller configured to control the applying portion, wherein when the transfer voltage is subjected to constant-voltage control so that the transfer voltage applied to the transfer member by the applying portion is substantially constant, in a case that the transfer voltage when the toner amount used for the toner image is a first toner amount is a first voltage, the controller controls the applying portion so that the transfer voltage is a second voltage smaller in absolute value than the first voltage in a case that the toner amount is a second toner amount larger than the first toner amount, and wherein the acquiring portion acquires the toner amount information on the toner amount for each toner image transferred onto a single recording material.

Further features of the present invention will become apparent from the following description of exemplary embodiments with reference to the attached drawings.

Figure 6:
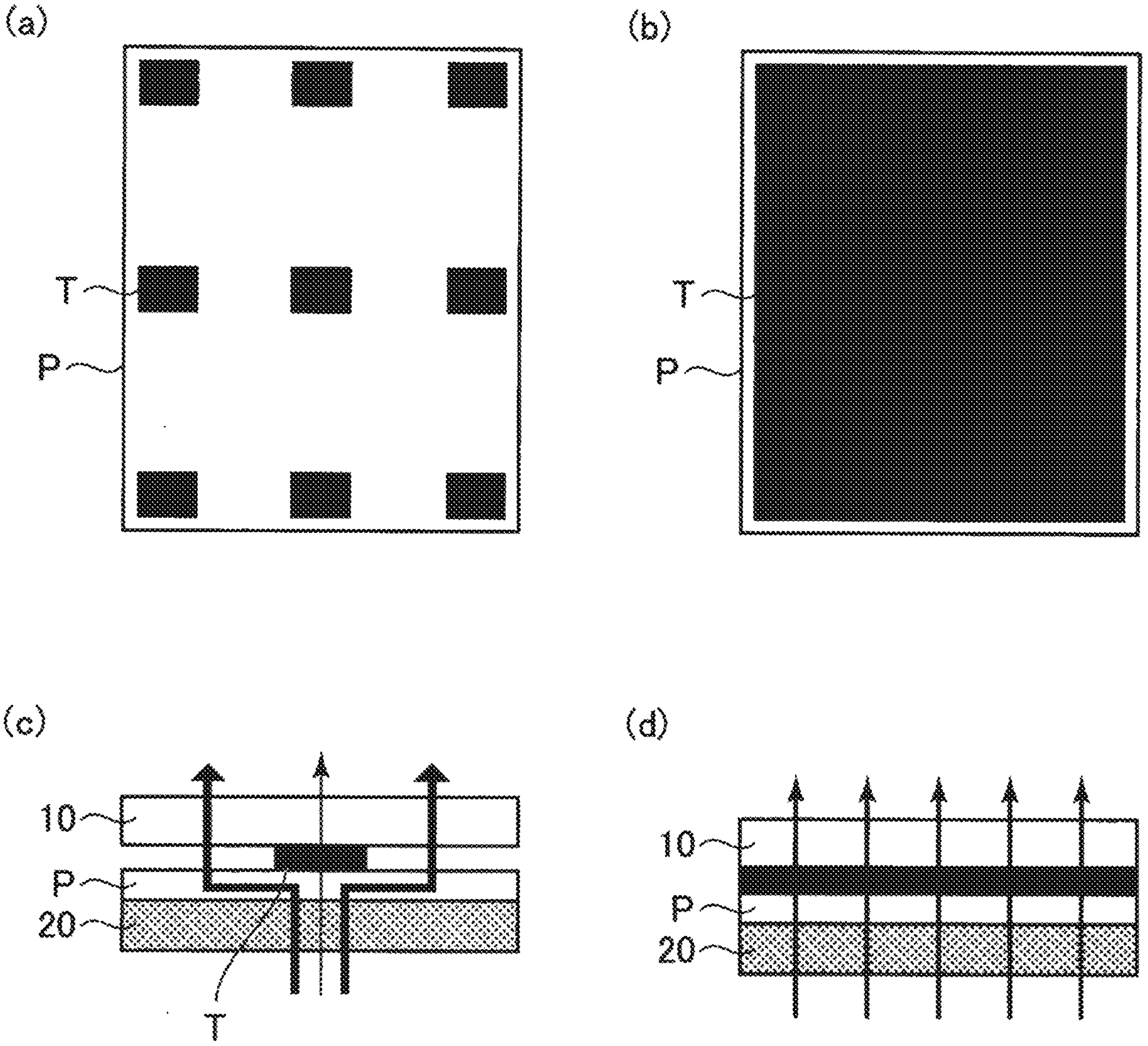

Parts (a) to (d) of FIG. 6 are schematic views for illustrating an effect of the embodiment 1.

Figure 7:
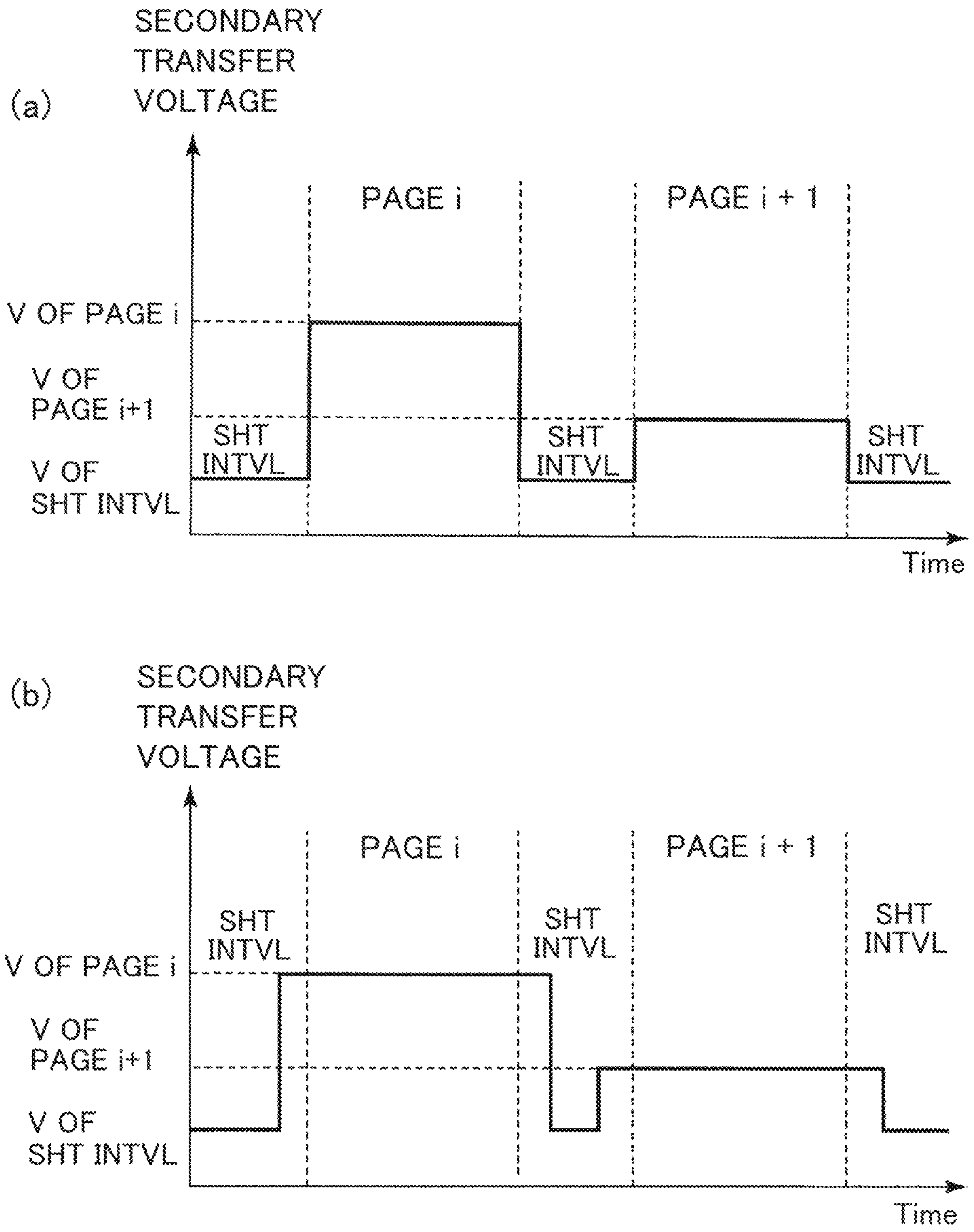

Parts (a) and (b) of FIG. 7 are timing charts each showing a control timing of the secondary transfer voltage.

Figure 8:
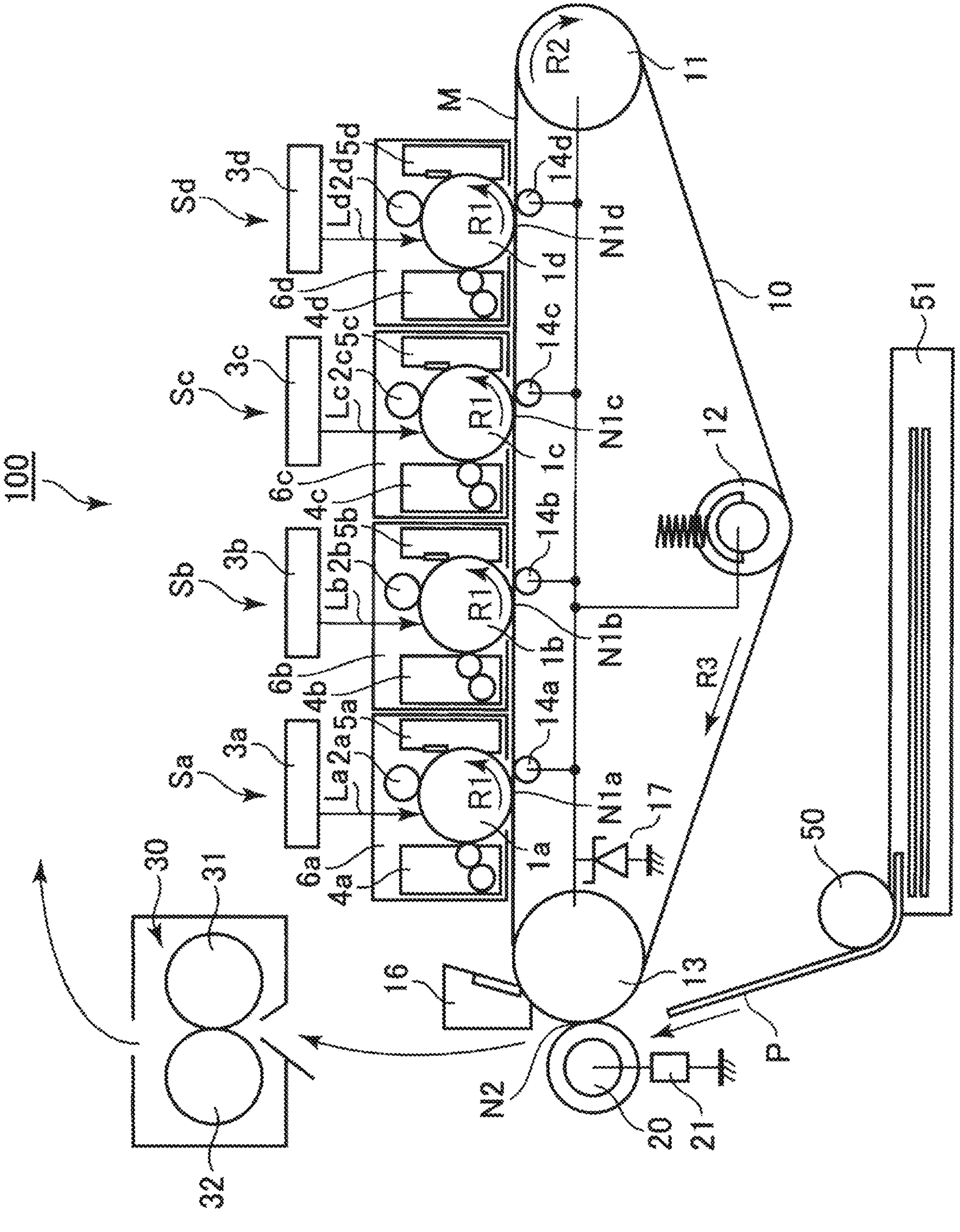

FIG. 8 is a schematic sectional view of another example of the image forming apparatus.

Figure 9:
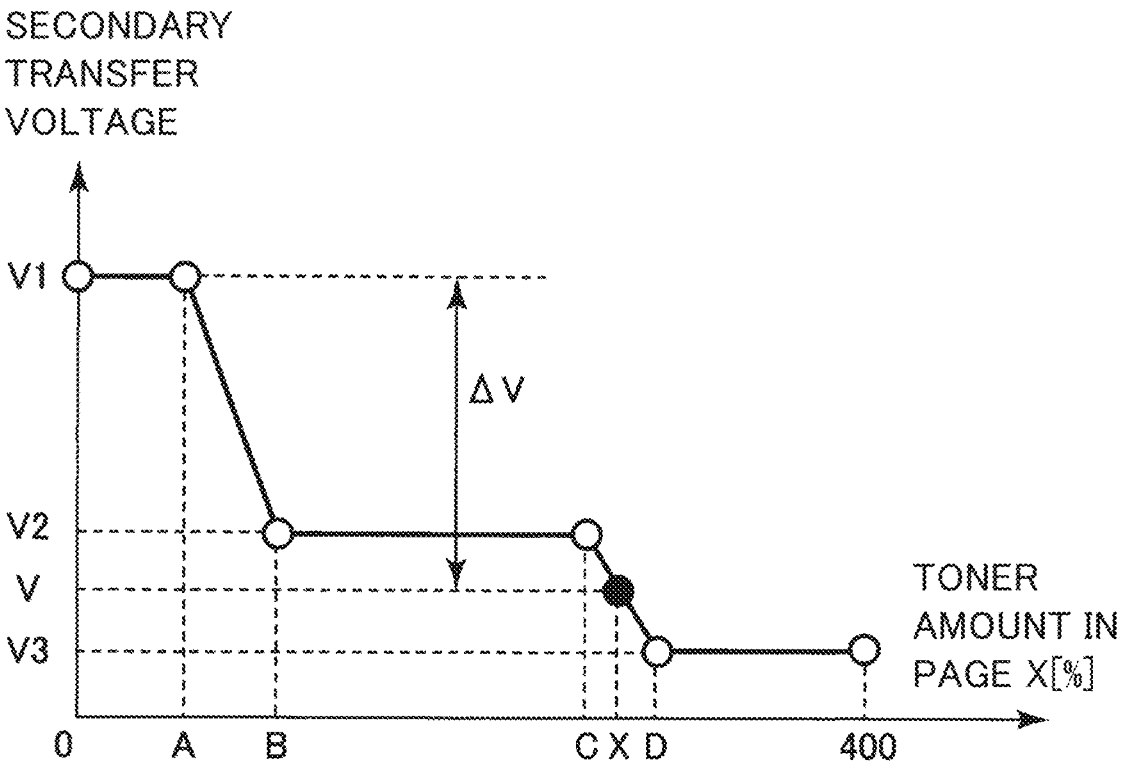

FIG. 9 is a graph for illustrating a secondary transfer voltage determining method in an embodiment 2.

Figure 10:
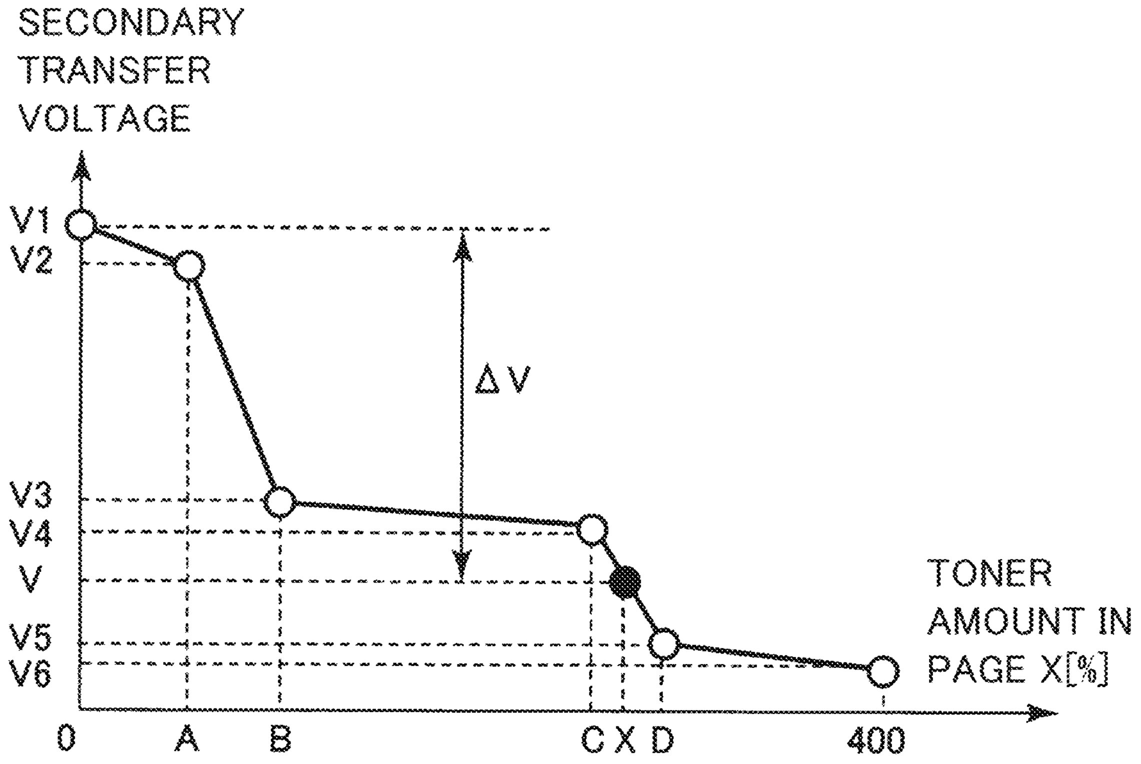

FIG. 10 is a graph for illustrating a secondary transfer voltage determining method in another constitution of the embodiment 2.

Figure 11:
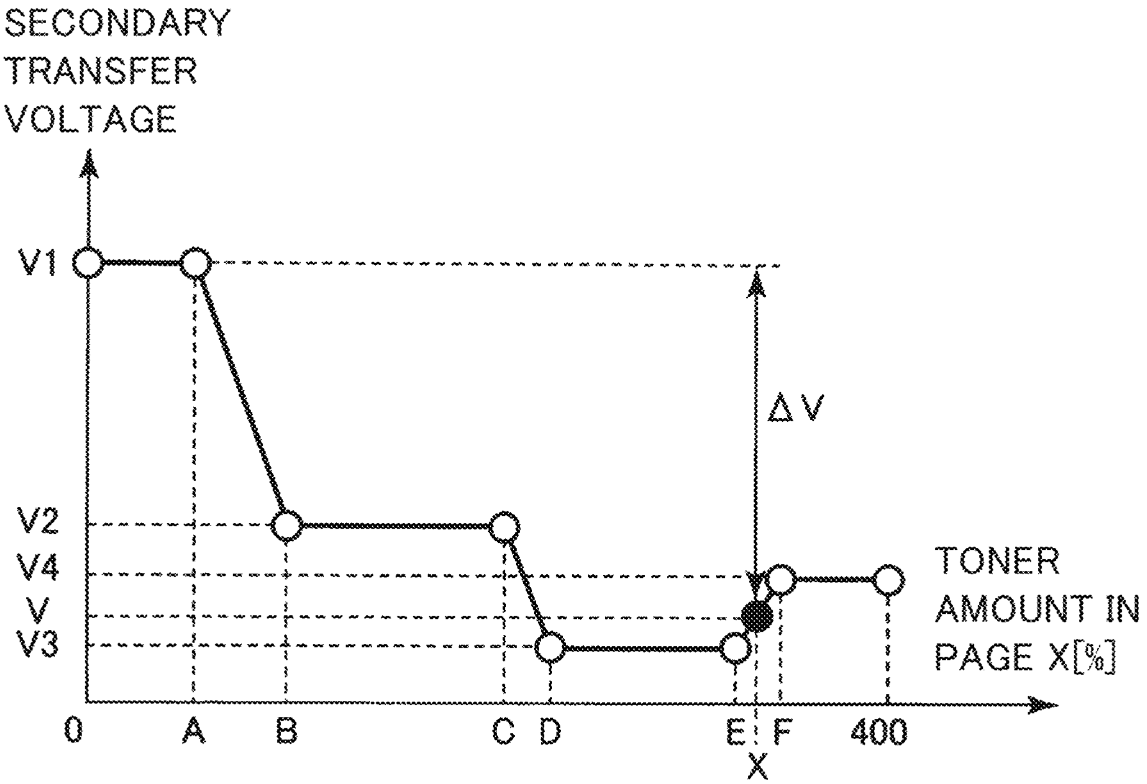

FIG. 11 is a graph for illustrating a secondary transfer voltage determining method in an embodiment 3.

Figure 12:
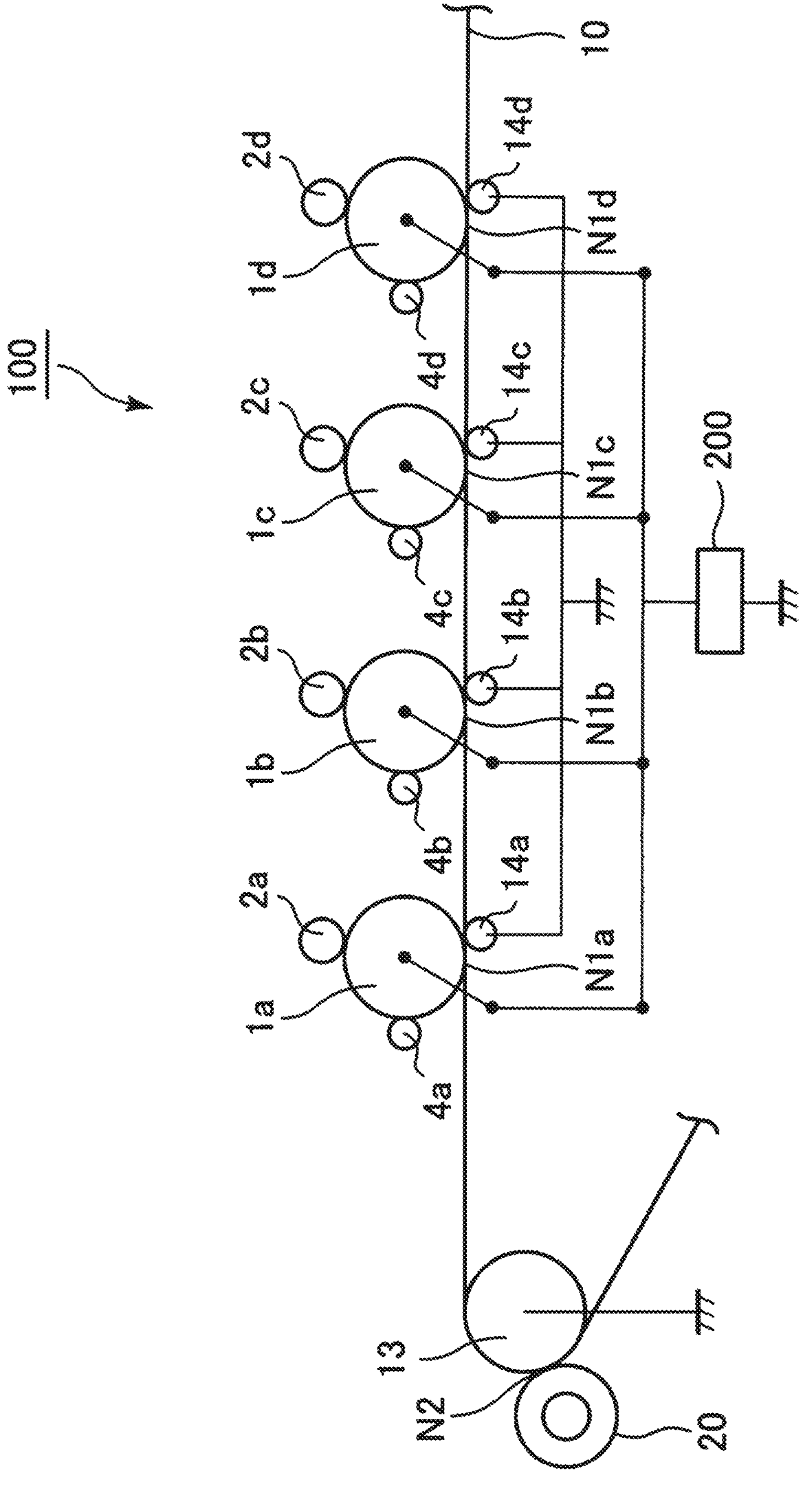

FIG. 12 is a schematic view of a constitution around a primary transfer portion of an image forming apparatus in an embodiment 4.

Figure 13:
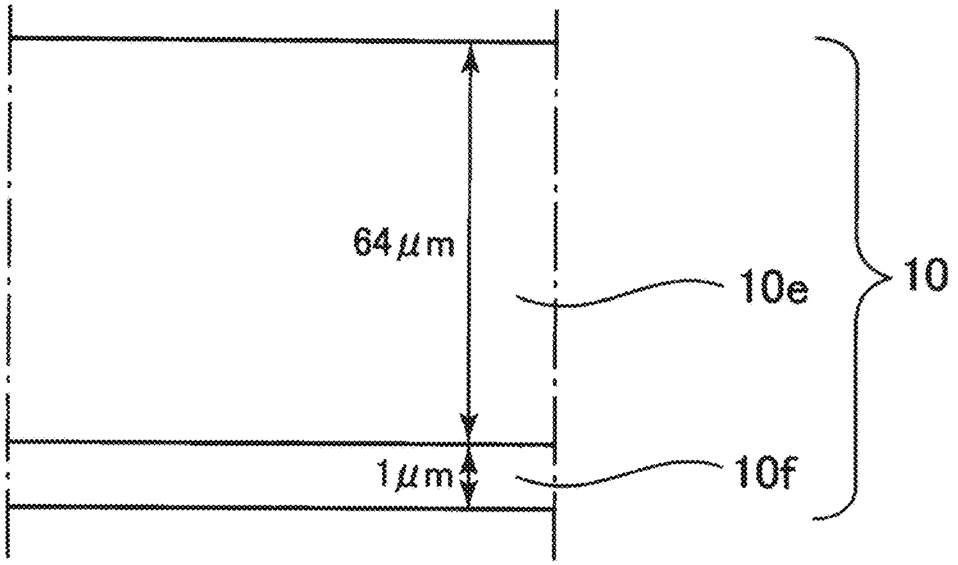

FIG. 13 is a schematic view showing a cross-sectional structure of an intermediary transfer belt in the embodiment 4.

Figure 14:
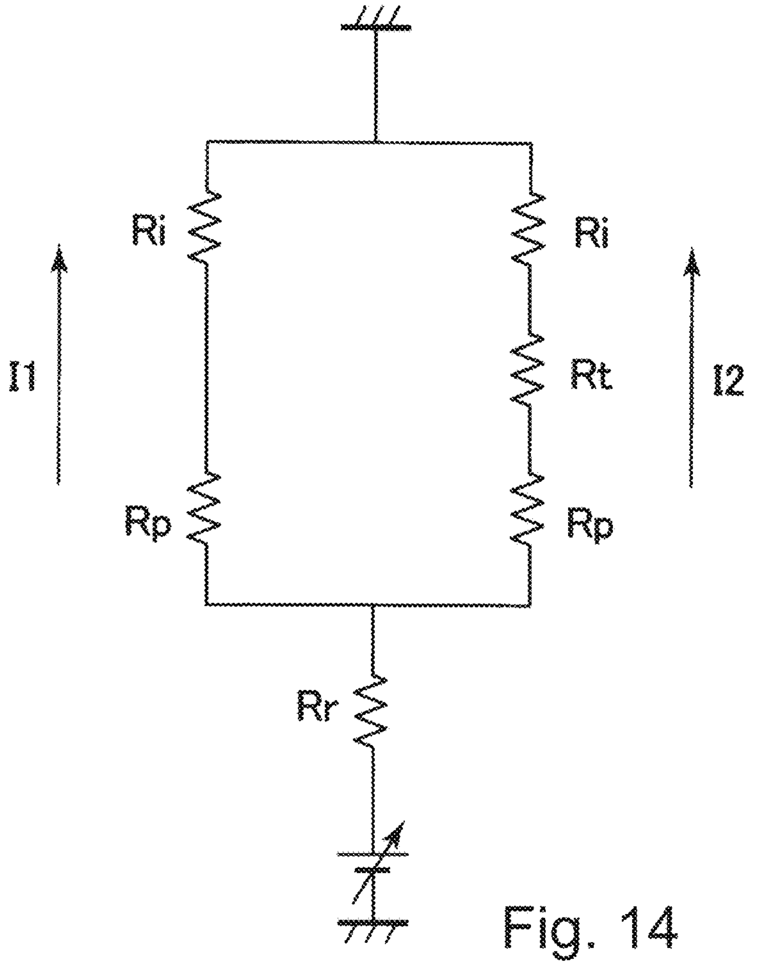

FIG. 14 is an equivalent circuit diagram relating to a secondary transfer portion in the embodiment 4.

DESCRIPTION OF THE EMBODIMENTS

In the following, an image forming apparatus according to the present invention will be described specifically with reference to the drawings.

Overall Structure and Operation of Image Forming Apparatus

Figure 1:
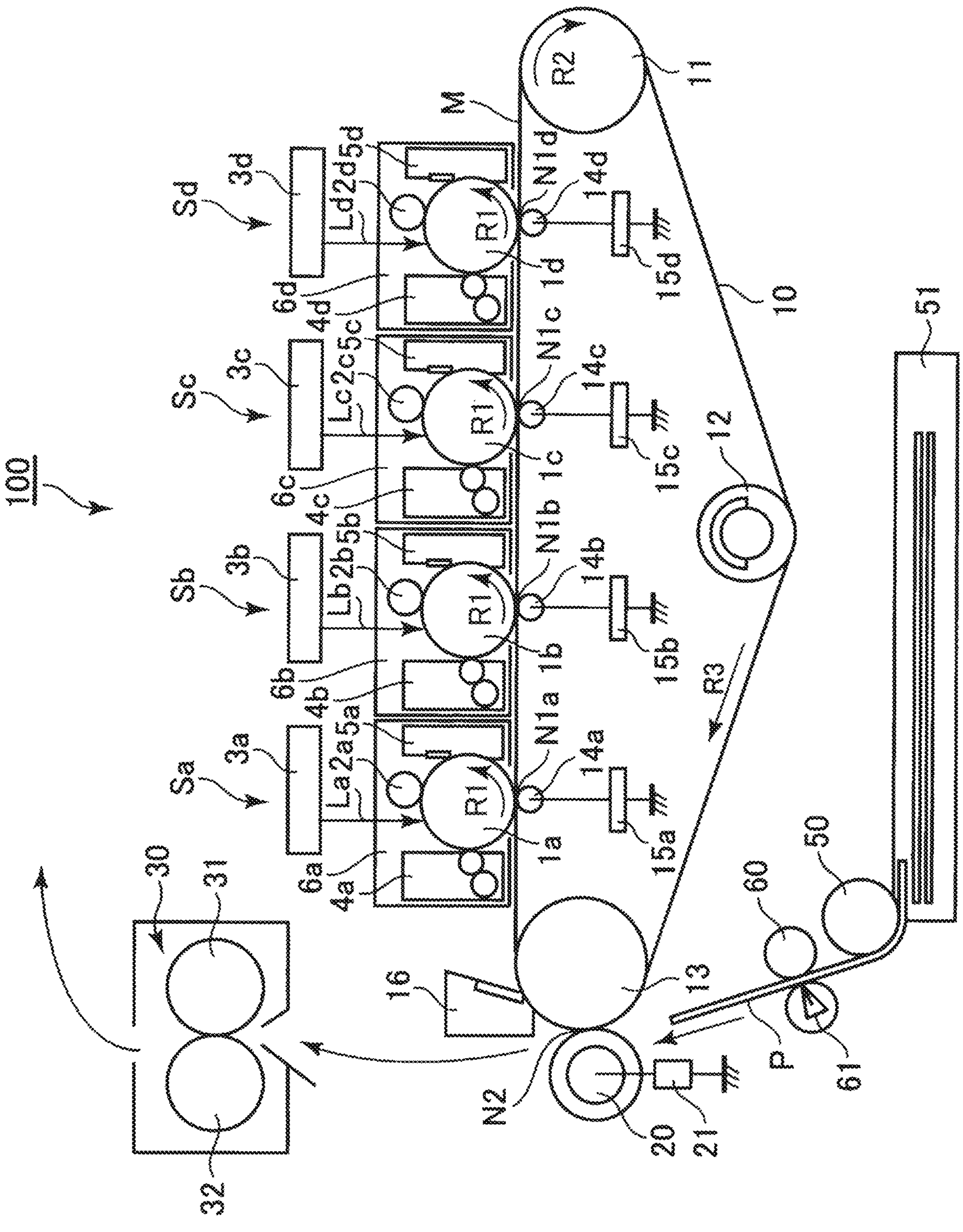
FIG. 1 is a schematic sectional view of an image forming apparatus.

FIG. 1 is a schematic sectional view of an image forming apparatus 100 of an embodiment 1. The image forming apparatus 100 of this embodiment is an electrophotographic full-color laser printer of an in-line type and an intermediary transfer type. The image forming apparatus 100 is capable of forming a full-color image on a recording material P (for example, a recording sheet, a plastic sheet or the like) in accordance with image information. The image information is inputted, to the image forming apparatus 100, from an image reading apparatus provided in or connected to the image forming apparatus 100 or a host device 199 (FIGS. 2 and 3) such as a personal computer communicatably connected to the image forming apparatus 100.

The image forming apparatus 100 includes, as a plurality of image forming portions (stations), first to fourth image forming portions Sa, Sb, Sc and Sd for forming images of yellow (Y), magenta (M), cyan (C) and black (K), respectively. In this embodiment, the first to fourth image forming portions Sa, Sb, Sc and Sd are disposed in line along a direction crossing a vertical direction. Incidentally, in this embodiment, structures and operations of the first to fourth image forming portions Sa, Sb, Sc and Sd are substantially the same except that colors of images to be formed are different from each other. As regards elements having the same or corresponding functions or constitutions in the image forming portions Sa, Sb, Sc and Sd, these elements are collectively described in some instances by omitting suffixes, a, b, c and d of reference numerals or symbols representing the elements for associated colors. The image forming portion S is constituted by including a photosensitive drum 1 (1*a*, 1*b*, 1*c*, 1*d*), a charging roller 2 (2*a*, 2*b*, 2*c*, 2*d*), an exposure device 3 (3*a*, 3*b*, 3*c*, 3*d*), a developing device 4 (4*a*, 4*b*, 4*c*, 4*d*), a primary transfer roller 14 (14*a*, 14*b*, 14*c*, 14*d*), a drum cleaning device 5 (5*a*, 5*b*, 5*c*, 5*d*), and the like which are described later.

The photosensitive drum 1 which is a rotatable drum type (cylindrical) photosensitive member (electrophotographic photosensitive member) as a first image bearing member is rotationally driven at a predetermined peripheral speed (process speed) in an arrow R1 direction (counterclockwise direction) in FIG. 1 by a driving motor as a driving means (driving source).

A surface of the photosensitive drum 1 is electrically charged substantially uniformly to a predetermined polarity (negative in this embodiment) and a predetermined potential by the charging roller 2 which is a roller type charging member as a charging means.

The charged surface of the photosensitive drum 1 is subjected to scanning exposure in accordance with image information by the exposure device (laser scanner unit) 3, so that an electrostatic latent image (electrostatic image) in accordance with the image information is formed on the photosensitive drum 1. The exposure device 3 irradiates the photosensitive drum 1 with laser light L on the basis of an output calculated from the image information, inputted from for example a host device 199 (FIGS. 2 and 3), by a CPU 221 (FIG. 3) described later. The electrostatic latent image formed on the photosensitive drum 1 is developed (visualized) by being supplied with the toner as a developer by the developing device 8 as a developing means, so that a toner image (developer image) is formed on the photosensitive drum 1. In this embodiment, on an exposure portion (image portion) of the photosensitive drum 1 where an absolute value of a potential is lowered through exposure to light after the uniform charging process, the toner charged to the same polarity (negative in this embodiment) as the charge polarity of the photosensitive drum 1 is deposited (reverse development). In this embodiment, a normal charge polarity of the toner which is the charge polarity of the toner during the development is the negative polarity.

An intermediary transfer belt 10 which is an intermediary transfer member constituted by an endless belt as a second image bearing member is disposed opposed to the four photosensitive drums 1*a* to 1*d*. The intermediary transfer belt 10 is extended around, as a plurality of supporting members (stretching rollers), a driving roller 11, a tension roller 12, and a secondary transfer opposite roller 13, and is stretched by a predetermined tension. The intermediary transfer belt 10 is contacted to the four photosensitive drums 1 in a transfer-receiving surface M formed between the secondary transfer opposite roller 13 and the driving roller 11. The driving roller is rotationally driven in an arrow R2 direction (clockwise direction) in FIG. 1 by the driving motor as the driving means (driving source). By this, the intermediary transfer belt 10 is rotated (circulated and moved) at a peripheral speed (process speed) corresponding to the peripheral speed of the photosensitive drum 1 in an arrow R3 direction (clockwise direction) in FIG. 1. On an inner peripheral surface side of the intermediary transfer belt 10, corresponding to the photosensitive drums 1*a* to 1*d*, the primary transfer rollers 14*a* to 14*d* which are roller type primary transfer members as primary transfer means are provided. Each primary transfer roller 14 presses the intermediary transfer belt 10 toward the associated photosensitive drum 1 and forms a primary transfer portion (primary transfer nip) N1 which is a contact portion between the photosensitive drum 1 and the intermediary transfer belt 10. The toner image formed on the photosensitive drum 1 is transferred (primary-transferred) onto the rotating intermediary transfer belt 10 by the action of the primary transfer roller 14 in the primary transfer portion N1. During a primary transfer step, to the primary transfer roller 14, a primary transfer voltage (primary transfer bias) of a polarity (positive in this embodiment) opposite to the normal charge polarity of the toner is applied by a primary transfer power (voltage) source (high-voltage (power) source) 15 as a primary transfer voltage applying means (primary transfer voltage applying portion). In this embodiment, to the primary transfer roller 14, as an example, a primary transfer voltage of +100 V is applied. For example, during full-color image formation, toner images of yellow, magenta, cyan and black formed on the respective photosensitive drums 1*a* to 1*d* are successively primary-transferred superposedly onto the intermediary transfer belt 10.

On an outer peripheral surface side of the intermediary transfer belt 10, at a position opposing the secondary transfer opposite roller (inner secondary transfer roller) 13, a secondary transfer roller (outer secondary transfer roller) 20 which is a roller type secondary transfer member as a secondary transfer means is provided. The secondary transfer roller 20 is pressed toward the secondary transfer opposite roller 13 and is contacted to the secondary transfer opposite roller 13 through the intermediary transfer belt 10, so that the secondary transfer roller 20 forms a secondary transfer portion (secondary transfer nip) N2 which is a contact portion between the intermediary transfer belt 10 and the secondary transfer roller 13. The toner image formed on the intermediary transfer belt 10 is transferred (secondary-transferred) onto the transfer material P fed while being nipped between the intermediary transfer belt 10 and the secondary transfer roller 20 by the action of the secondary transfer roller 20 in the secondary transfer portion N2. During a secondary transfer step, to the secondary transfer roller 25, a secondary transfer voltage (secondary transfer bias) of the polarity (positive in this embodiment) opposite to the normal charge polarity of the toner is applied by a secondary transfer power source (high voltage power source) 21 as a secondary transfer voltage applying means (secondary transfer voltage applying portion). Incidentally, in this embodiment, the secondary transfer opposite roller 13 is connected to a ground potential. For example, during the full-color image formation, the four color toner images on the intermediary transfer belt 10 are collectively transferred onto the recording material P in the secondary transfer portion N2. The recording materials S are accommodated in a cassette 51 as a recording material accommodating portion.

The recording materials P are fed one by one from the cassette 51 by a feeding roller 50 or the like as a feeding means, and the fed recording material P is conveyed to a registration roller pair 60. Then, this recording material P is conveyed by the registration roller pair 60 by being timed to the toner images on the intermediary transfer belt 10. A feeding timing of the recording material P by the registration roller pair 60 is controlled on the basis of a detection result of a registration sensor 61 for detecting a leading end of the recording material P with respect to the feeding direction of the recording material P.

Incidentally, a constitution in which a voltage of the same polarity as the normal charge polarity of the toner is applied to the inner secondary transfer roller corresponding to the secondary transfer opposite roller 13 in this embodiment and in which the outer secondary transfer roller corresponding to the secondary transfer roller 20 in this embodiment is connected to the ground potential can also be employed.

The recording material P on which the toner images are transferred is conveyed to a fixing device 30 as a fixing means. The fixing device 30 includes a fixing roller 31 provided with a heat source and a pressing roller 32 press-contacted to the fixing roller 31. In the fixing device 30, heat and pressure are applied to the recording material S, on which the unfixed toner images are carried, in a fixing nip which is a contact portion between the fixing roller 31 and the pressing roller 32, so that the toner images are fixed (melted and stuck) on the recording material P. For example, during the full-color image formation, the four color toner images on the recording material P are melted and color-mixed by being heated and pressed in the fixing nip and are fixed on the recording material P. The recording material P on which the toner images are fixed is discharged (outputted) from an apparatus main assembly of the image forming apparatus 100.

The image forming apparatus 100 of this embodiment is capable of executing double-side printing (automatic double-side printing in which the recording material P on which first side the toner images are transferred and fixed is conveyed again to the secondary transfer portion N2 and after the toner images are transferred and fixed on a second side of the recording material P, the recording material P is discharged to an outside of the apparatus main assembly. In order to execute the double-side printing, the image forming apparatus 100 includes a double-side feeding mechanism (not shown) for feeding again, to the secondary transfer portion N2, the recording material P on which first side the toner images are fixed. In the case of single-side printing, the recording material P on which first side the toner images are fixed is directly discharged to the outside of the apparatus main assembly.

On the other hand, a deposited matter such as toner (primary transfer residual toner) remaining on the photosensitive drum 1 after the primary transfer is removed and collected from the surface of the photosensitive drum 1 by the drum cleaning device 5 as the intermediary transfer belt member cleaning means. Further, a deposited to matter such as toner (secondary transfer residual toner) remaining on the intermediary transfer belt 13 after the secondary transfer is removed and collected from the surface of the intermediary transfer belt 13 by a belt cleaning device 16 as an intermediary transfer member cleaning means.

Incidentally, the image forming apparatus 100 is also capable of forming a monochromatic (single color) image or a multi-color image by using only a single image forming portion S or some (not all) of the image forming portions S.

Further, in each of the image forming portions S, the photosensitive drum 1 and, as process means actable on the photosensitive drum 1, the charging roller 2, the developing device 4, and the drum cleaning device 5 integrally constitute a process cartridge 6 detachably mountable to the apparatus main assembly of the image forming apparatus 100. The process cartridge 6 is capable of being mounted in and dismounted from the apparatus main assembly through mounting means such as a mounting guide and a positioning member which are provided in the apparatus main assembly.

Further, the image forming apparatus 100 of this embodiment is capable of forming and outputting the image at a process speed of 148 mm/sec on an A5-size paper, an A4-size paper, a LTR-size paper, or the like.

Here, in this embodiment, the primary transfer roller 14 is a cylindrical metal roller of 6 mm in outer diameter, and as a material thereof, nickel-plated SUS is used. The primary transfer roller 14 is disposed at a position of 8 mm offset toward the downstream side relative to a center position of the photosensitive drum 1 with respect to a movement direction of the intermediary transfer belt 10, and is constituted so that the intermediary transfer belt 10 is wound about the photosensitive drum 1. In order to ensure a winding amount of the intermediary transfer belt 10 about the photosensitive drum 1, the primary transfer roller 14 is disposed at a position where the intermediary transfer belt 10 is raised by 1 mm toward the photosensitive drum 1 side relative to a horizontal surface formed by the photosensitive drum 1 and the intermediary transfer belt 10. The primary transfer roller 14 presses the intermediary transfer belt 10 toward the photosensitive drum 1 side by a force of about 200 gf. Further, the primary transfer roller 14 is rotated with rotation of the intermediary transfer belt 10.

Further, in this embodiment, the secondary transfer roller 20 is contacted to the intermediary transfer belt 20 by a pressing force of 50 N and forms the secondary transfer portion N2. The secondary transfer roller 20 is rotated with rotation of the intermediary transfer belt 10. The recording material P such as the paper is nipped and fed by the intermediary transfer belt 10 and the secondary transfer roller 20 in the secondary transfer portion N2. The secondary transfer roller 20 is a roller of 18 mm in outer diameter in which a nickel-plated steel rod of 8 mm in outer diameter is used as a core metal and is covered around thereof with a foamed sponge material which is used as an elastic layer and which is principally formed in a thickness of 5 mm with an NBR-epichlorohydrin rubber adjusted to have a volume resistivity of $10^8$ Ω·cm. Incidentally, in this embodiment, a secondary transfer power (voltage) source 21 is capable of outputting a voltage in a range of 100 V-5000 V. Incidentally, herein, a numerical range shown by using "-" means that the numerical range is a range including numerical values before and after the "-".

Further, in this embodiment, the fixing roller 31 as a fixing member is a roller of 18 mm in outer diameter in which an elastic layer of an insulating silicone rubber is formed around a metal bare tube and an outer peripheral surface of the elastic layer is coated with an insulating PFA tube. This fixing roller 31 includes a halogen heater (not shown) as a heating means. The halogen heater is in non-contact with the fixing roller 31 an generates heat by being supplied with a voltage by a power source (not shown). Further, in this embodiment, the pressing roller 32 as a pressing member is a roller of 18 mm in outer diameter in which an elastic layer of an electroconductive silicone rubber is formed around a core metal and an outer peripheral surface of the elastic layer is coated with an electroconductive PFA tube. The fixing roller 31 and the pressing roller 32 form the fixing nip by being pressed by a pressing force of 10 kgf. The pressing roller 32 is rotationally driven by a driving motor as a driving means (driving source). The fixing roller 31 is rotated with rotation of the pressing roller 32. The recording material P is nipped and fed in the fixing nip by the fixing roller 31 and the pressing roller 32. The pressing roller 32 is connected from the core metal to the ground (ground potential) through a resistance element (not shown) of 1000 MΩ. Electric charges on the fixing roller 31 and the pressing roller 32 are caused to escape to the ground through the pressing roller 32 and the resistance element, so that it is possible to suppress that the surface of the fixing roller 31 and the surface of the pressing roller 32 are electrically charged.

Figure 2:
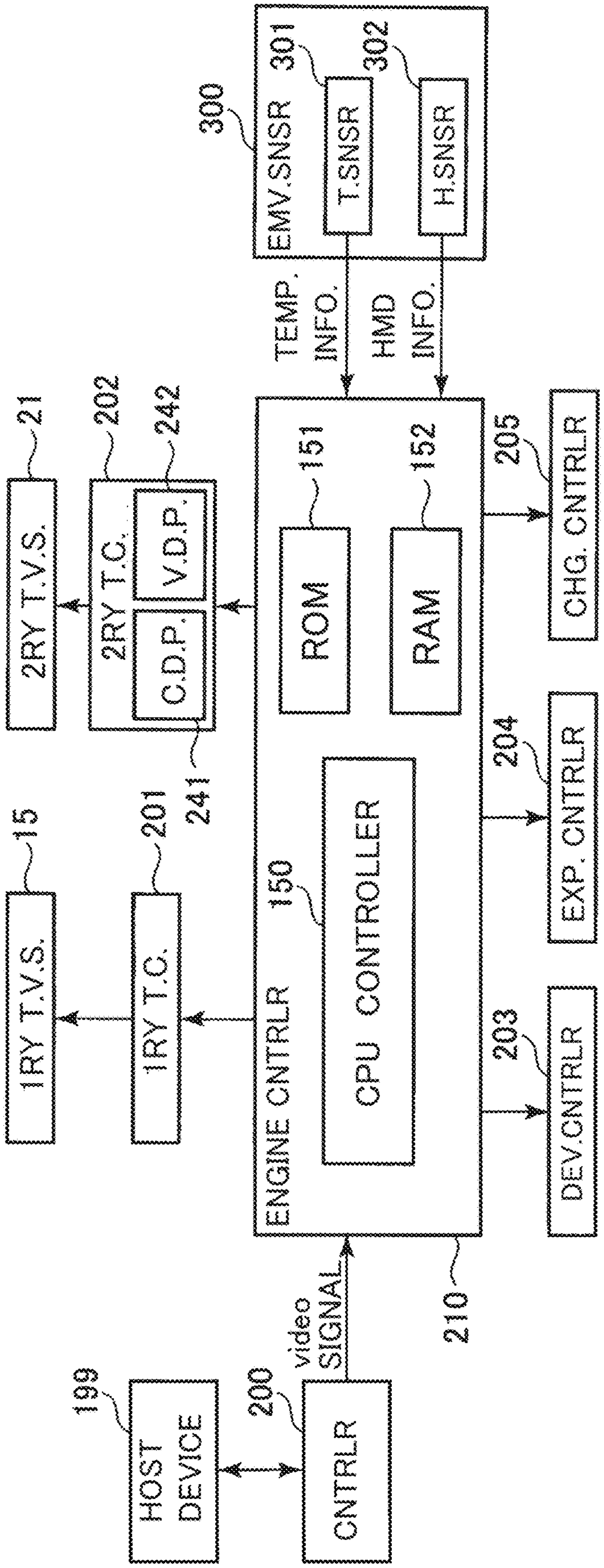
FIG. 2 is a block diagram showing a control mode of the image forming apparatus.

FIG. 2 is a block diagram for illustrating a constitution of an engine controller 210 for controlling entirety of the image forming apparatus 100 of this embodiment. The engine controller 210 incorporates a CPU circuit portion 150, a ROM 151, and a RAM 152. The CPU circuit portion 150 carries out integrated control of a primary transfer controller 201, a secondary transfer controller 202, a development controller 203, an exposure controller 204, a charge controller 205, and the like in accordance with a control program stored in the ROM 151. Control tables (environmental table, recording material width/recording material thickness correspondence table, and the like) relating to control of the secondary transfer voltage, which are described later are stored in the ROM 151, and the CPU 221 (FIG. 3) mounted in the CPU circuit portion 150 calls up the control tables and reflects the control tables in control. The RAM 152 temporarily holds control data and is used as an operation area of a calculation (computation) process with the control.

The primary transfer controller 201 and the secondary transfer controller 202 control the primary transfer power source voltage source) 15 and the secondary transfer power source (voltage source) 21, respectively. The primary transfer controller 201 and the secondary transfer controller 202 control voltages outputted from the primary transfer power source 15 and the secondary transfer power source 21, respectively, on the basis of a current value or the like detected by an associated one of current detecting portions (control detecting circuits). Control of the secondary transfer voltage will be described specifically later.

To the engine controller 210, an environmental sensor 300 as an environment detecting means (environment detecting portion) for detecting at least one of a temperature and a humidity in at least one an inside and an outside of the image forming apparatus 100 is connected. In this embodiment, the environmental sensor 300 incorporates a temperature sensor 301 as a temperature detecting means (temperature detecting portion) and a humidity sensor 302 as a humidity detecting means (humidity detecting portion), and detects an ambient temperature an ambient humidity of the image forming apparatus 100. The environmental sensor 300 inputs, to the engine controller 210, a signal indicating a detection result of the temperature by the temperature sensor 301 (temperature information) and a signal indicating a detection result of the humidity (relative humidity) by the humidity sensor 302 (humidity information).

Further, to the engine controller 210, the controller 200 is connected. The controller 200 receives print information (image information), various pieces of setting information) and a print instruction (start instruction of a print job) from the host device 199 which is an external device. Then, the engine controller 210 executes an operation of the print job by controlling the respective controllers (the primary transfer controller 201, the secondary transfer controller 202, the development controller 203, the exposure controller 204, the charge controller 205, and the like). Incidentally, in this embodiment, in order to carry out the control of the secondary transfer voltage described later, the engine controller 210 acquires the environmental information from a detection result of the environment sensor 300 an acquires information of the recording material P from the print information from the host device 199. Incidentally, the print information is inputted from the host device 199 to the controller 200 through a printer driver installed in the host device 199.

Here, the image forming apparatus 100 executes the print job (printing job, image output operation) which is a series of operations which is started by a single start instruction and in which an image is formed and outputted on a single recording material P or images are formed and outputted on a plurality of recording materials P. The print job generally includes an image forming step, a pre-rotation step, a sheet (paper) interval step in the case where the images are formed on the plurality of recording materials P, and a post-rotation step. The image forming step corresponds to a period in which formation of the electrostatic latent image for the image actually formed and outputted on the recording material P, formation of the toner image, primary transfer of the toner image, and secondary transfer of the toner image, and during image formation (image forming period) means this period. Specifically, at positions where the respective steps of the formation of the electrostatic latent image, the formation of the toner image, the primary transfer of the toner image, and the secondary transfer of the toner image are carried out, timings during the image formation are different from each other. The pre-rotation step corresponds to a period in which a preparatory operation before the image forming step, from input of the start instruction until image formation is actually started is performed. The sheet interval step corresponds to a period corresponding to a timing between a recording material P and a subsequent recording material P when the images are continuously formed on the plurality of recording materials P (continuous image formation). The post-rotation step corresponds to a period in which a post-operation (preparatory operation) after the image forming step is performed. During non-image formation (non-image forming period) corresponds to a period other than during image formation and includes the above-described pre-rotation step, sheet interval step, and post-rotation step, and further a pre-multi-rotation step which is a preparatory step during turning-on of a power source (main switch) of the image forming apparatus 100 or during restoration from a sleep state.

Outline of Control of Secondary Transfer Voltage

Next, an outline of control of the secondary transfer voltage in this embodiment will be described.

As shown in FIG. 1, the secondary transfer power source 21 is connected to the secondary transfer roller 20, and a secondary transfer voltage outputted from the secondary transfer power source 21 is supplied to the secondary transfer roller 20. By applying the secondary transfer voltage from the secondary transfer power source 21 to the secondary transfer roller 20, an electric field is formed between the secondary transfer roller 20 and the secondary transfer opposite roller 13 provided at an opposing portion to the secondary transfer roller 20. By this, induced polarization is generated between the intermediary transfer belt 10 and the recording material P, so that an electrostatic attraction force is generated therebetween.

As shown in FIG. 2, the secondary transfer controller 202 includes a current detecting portion (ammeter) 241 as a current detecting means for detecting a current flowing through the secondary transfer portion N2 (secondary transfer roller 20) under application of the voltage from the secondary transfer power source 21 to the secondary transfer roller 20. The secondary transfer controller 202 is capable of controlling a voltage value outputted by the secondary transfer power source 21 so that the current flowing through the secondary transfer portion N2 becomes substantially constant at a target current value (approaches a target value). During the image formation (during secondary transfer), the current flowing through the secondary transfer portion N2 is detected in a predetermined cycle period (current detecting cyclic period) by the current detecting portion 241. Then, in the secondary transfer controller 202, a voltage value of the secondary transfer voltage applied to the secondary transfer roller 20 in a subsequent current detecting cyclic period is determined. The secondary transfer controller 202 determines the voltage value of the secondary transfer voltage in the subsequent current detecting cycle period by feeding back, to the secondary transfer power source 21, a difference between a preset target current value and a detection current value which is an actual output value and which is detected by the current detecting portion 241. That is, the voltage value of the secondary transfer voltage applied to the secondary transfer roller 20 in the subsequent detecting cycle period so that the detection current value approaches the target current value. By this, the secondary transfer voltage applied from the secondary transfer power source 21 to the secondary transfer roller 20 is controlled so that the current flowing through the secondary transfer portion N1 becomes substantially constant. Herein, control such that the secondary transfer voltage is applied from the secondary transfer power source 21 to the secondary transfer power source 21 to the secondary transfer roller 20 so that the current value detected by the current detecting portion 241 becomes substantially constant at the preset predetermined current value is referred to as "constant-current control".

On the other hand, as shown in FIG. 2, the secondary transfer controller 202 includes a voltage detecting portion 242 as a voltage detecting means for detecting a voltage value applied from the secondary transfer power source 21 to the secondary transfer roller 20. The secondary transfer controller 202 is capable of carrying out control so that the voltage value outputted by the secondary transfer power source 21 becomes substantially constant at a target voltage value (approaches a target value). Incidentally, the voltage detecting portion 242 may detect (recognize) the voltage value from an indicated value of an output voltage value to the secondary transfer power source 21. In a high-temperature/high-humidity environment or the like, the recording material P, the secondary transfer roller 20, and the intermediary transfer belt 10, and the like are lowered in electric resistance value by the influence of moisture absorption. In such a state, when the "constant-current control" of the secondary transfer voltage is carried out, an absolute value of the secondary transfer voltage necessary to output the target current value becomes small, and therefore, there is a possibility that an electric field necessary to transfer the toner onto the recording material P is not formed and thus improper transfer occurs. For that reason, a lower limit (value) is provided for setting of the voltage value of the secondary transfer voltage, and in the case where the secondary transfer voltage is below the lower limit when the constant-current control is carried out in the high-temperature/high-humidity environment or the like, the secondary transfer voltage is controlled so that the voltage value becomes substantially constant the target voltage value corresponding to the lower limit. By this, a necessary minimum voltage for transferring the toner onto the recording material P is ensured, so that the secondary transfer can be performed. Herein, control such that the secondary transfer voltage which is substantially constant at the preset predetermined voltage value is applied from the secondary transfer power source 21 to the secondary transfer roller 20 (control in which an applied voltage is made substantially constant irrespective of the current value) is referred to as "constant-voltage control".

In this embodiment, on the basis of detection results of the temperature sensor 301 and the humidity sensor 302 of the environmental sensor 300, the CPU 221 (FIG. 3) of the engine controller 210 calculates an absolute water content of an environment in which the image forming apparatus 100 is installed. Then, depending on the calculated absolute water content, the CPU 221 determines whether the control of the secondary transfer voltage by the secondary transfer controller 202 is carried out through the "constant-current control" or the "constant-voltage control", and then provides an instruction to the secondary transfer controller 202. In this embodiment, the "constant-voltage control" of the secondary transfer voltage is carried out in the case where the absolute water content is 21.7 g/m$^3$ or more, and the "constant-current control" of the secondary transfer voltage is carried out in the case where the absolute water content is less than 21.7 g/m$^3$.

Details of Control of Secondary Transfer Voltage in This Embodiment

One of features of this embodiment is that in the constant-voltage control of the secondary transfer voltage, a toner amount of the toner transferred onto the recording material P is calculated on the basis of image information and then a preset reference secondary transfer voltage value is corrected on the basis of a calculation result. Particularly, at that time, the feature of this embodiment is such that an absolute value of the secondary transfer voltage is made smaller with an increasing toner amount (i.e., the absolute value of the secondary transfer voltage is made larger with a decreasing toner amount).

Calculation of Toner Amount

Figure 3:
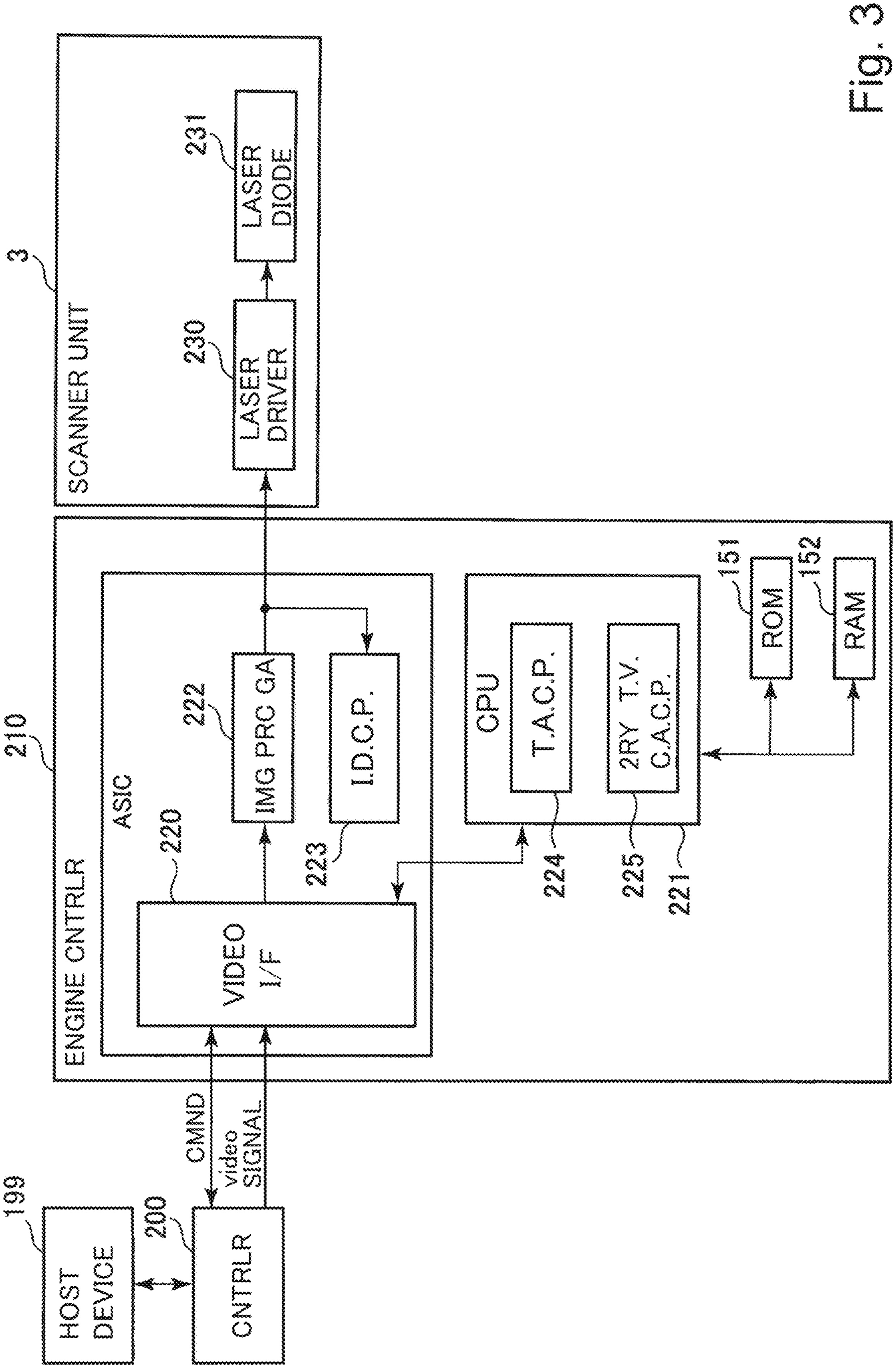
FIG. 3 is a functional block diagram relating to calculation of a toner amount.

Referring to FIG. 3, a calculating method of the toner amount of the toner transferred onto the recording material P in this embodiment will be described. FIG. 3 is a function block diagram relating to calculation of the toner amount of the toner transferred onto the recording material P in the image forming apparatus 100 of this embodiment. In this embodiment, toner amount information on the toner amount of the toner transferred onto the recording material P, which is used in the control of the secondary transfer voltage in this embodiment, i.e., a calculating method and physical meaning of a toner amount X in (one) page will be described.

The controller 200 is capable of mutual communication with the host device 199 and the engine controller 210. When the controller 200 receives the print information inputted from the host device 199, the controller 200 develops the print information and converts the print information to image data. Then, on the basis of the image data, the controller 200 generates video signals for exposure corresponding to four colors for the purpose of exposing the photosensitive drums 1 to light by the exposure devices 3 in the four image forming portions S. When the generation of the video signals is completed, the controller 200 inputs a print job start instruction to a video interface portion 220 of the engine controller 210. Thereafter, the CPU 221 of the engine controller 210 actuates various actuators when receives the print job start instruction from the video interface portion 220, and thus starts preparation of the image formation. When the preparation of the image formation is made, the CPU 221 notifies the controller 200 of completion of the preparation of the image formation through the video interface portion 220. When the controller 220 receives a signal indicating completion of the image formation preparation, the CPU 221 sends a video signal to the video interface portion 220.

The video interface portion 220 sends the received video signal to an image processing GA 222 of the engine controller 210. The image processing GA 222 receives the video signal from the video interface portion 220 and converts the video signal to a laser driving signal, and then sends the laser driving signal to a laser driving portion 230 of the exposure device 3. Depending on the laser driving signal, the laser driving portion 230 controls a current supplied to a laser diode 231 as a light source of the exposure device 3 and thus controls light emission of the laser diode 231. Further, an image data counting portion 223 of the engine controller 210 samples the laser driving signal and counts the number of times when the signal becomes High (light emission) (hereinafter represented by "H". The image data counting portion 223 does not count the number of times in the case where the signal is Low (lights-out) (hereinafter represented by "L") when samples the laser driving signal. Incidentally, in this embodiment, the video interface portion 220, the image processing GA 222, and the image data counting portion 223 are realized by ASIC mounted in the CPU circuit portion 150 of the engine controller 210.

The CPU 221 causes the image data counting portion 223 to count, for one page, each of respective color pixel count values ny, nm, nc and nk which are the numbers of times when the laser driving signals relating to the four colors of Y, M, C and K, respectively, became "H". Then, the CPU 221 calculates a pixel current value n (=ny+nm+nc+nk) which is the sum of the respective color pixel count values. When the total number of samplings for one color corresponding to one page is N, the toner amount X [%] in one page is calculated by a formula (1) shown below. Incidentally, in this embodiment, calculation of the toner amount X in one page is performed by a toner amount calculating portion 224 realized by the CPU 211 mounted in the CPU circuit portion 150 of the engine controller 210.

$$\text{(Toner amount } X \text{ [\%] in one page)} = \{\text{(pixel count value } n\text{)/(total sampling number } N \text{ per (one) color)}\} \times 100 \tag{1}$$

Sampling of the total sampling number N per (one) color is performed at a different timing since laser drive is carried out at a different timing for each of the colors. In this embodiment, a sampling cyclic period was set at a short cyclic period (100 MHz) so that all the number of pixels in one page can be counted. Accordingly, the total sampling numbers Ny, Nm, Nc and Nk for the four colors of Y, M, C and K, respectively, are Ny=Nm=Nc=Nk. In this embodiment, a maximum value of the color pixel count values ny, nm, nc and nk corresponds to the total sampling number N per (one) color, and therefore, X is capable of taking values of 0-400 [%} (0-100 [%} per (one) color). That is, in this embodiment, the toner amount information on the toner amount of the toner transferred onto the recording material P represents the toner amount X [%] which is a ratio of the toner amount of the toner transferred onto the recording material P to a total toner amount, for each (one) color, of the toner capable of being transferred onto the recording material P.

As described above, the toner amount X in page refers to a total amount (specifically, a predicted value thereof) of the toner transferred onto a single recording material P (specifically, an image formable region). The case where the toner amount X in page is less than 100% roughly represents that a single recording material P is coated with how many amounts of the toner. At this time, the state means a state in which a white portion is larger with a smaller numerical value of the toner amount X in page. Particularly, the case where the toner amount X in page is less than 10% roughly represents a state such that same texts or isolated patch patterns described later exist in the white portion ranging over almost entire surface of the single recording material P. The case where the toner amount X in page is 100% or more roughly represents a state in which almost entire surface of the single recording material P is coated with the toner and that the toner has how many toner amount for the four colors with respect to a high direction. At this time, the state means a state in which the toner exists in a larger amount with respect to the height direction with a larger numerical value of the toner amount X in page. A state in which the toner amount X in page is 10-100% is a state such that there is a possibility that in a relatively large area of the single recording material P, the recording material P is coated with the isolated patch pattern described later and toner of a half-tone image described later in mixture.

In this embodiment, an object of calculating the toner amount X in page is to predict that how to coat the single recording material P with the toner. Further, in this embodiment, on the basis of this predicted coating state of the single recording material P with the toner, a correction amount (correction value) ΔV of the secondary transfer voltage is determined.

Determining Method of Secondary Transfer Voltage

A determining method of a reference secondary transfer voltage when the constant-voltage control of the secondary transfer voltage in this embodiment is executed, and a corresponding method of the secondary transfer voltage (secondary transfer voltage determining method) based on the toner amount X in page will be described.

First, a determining method of a voltage V1 (reference value) which is the reference secondary transfer voltage when the constant-voltage control of the secondary transfer voltage is executed will be described. In this embodiment, the voltage V1 is determined by the CPU 221 on the basis of information on the recording material P acquired from the print information inputted from the host device 199 and the environmental information acquired from the detection result of the environmental sensor 300. In this embodiment, the information on the recording material P includes information on a sized of the recording material P (hereinafter, referred to as "paper size") including information of a length of the recording material P in a widthwise direction substantially perpendicular to a feeding direction of the recording material P (hereinafter, this length is simply referred to as a "width"), information on index (thickness, basis weight, or the like) relating to a thickness of the recording material P, and information on a category (plain paper, thick paper, high-quality paper, or the like), hereinafter, referred to as a "paper quality"). Further, in this embodiment, the environmental information includes information on an ambient absolute water content calculated by the CPU 221 on the basis of detection results of the temperature sensor 301 and the humidity sensor 302 of the environmental sensor 300. Incidentally, the information on the recording material P include any pieces of information capable of discriminating the recording material P, such as attributes (so-called category (paper quality)) based on a general feature, such as plain paper, high-quality paper, glossy paper, coated paper, embossed paper, thick paper, and thin paper, numerical values or numerical value ranges, such as a basis weight, a thickness, a size, and rigidity; or brands (including a manufacturer, a trade name, a product number, and the like). For each of the recording materials P distinguished by the information on the recording material P, the information on the recording material P can be regarded a constituting a kind of the recording material P. The information on the recording material P may be, for example, directly designated or included in information of a print mode, such as a "plain paper mode" or "thick paper mode", for designating an operation setting of the image forming apparatus 100, or may also be substituted by the information of the print mode. That is, in this embodiment, for each kind of the recording material P, information indicating a relationship of the voltage V1 with the paper size, the basis weight, the paper quality, and the absolute water content is set in advance and is stored as a table in the ROM 151. Then, on the basis of the acquired information on the recording material P and the acquired environmental information, the CPU 221 calls up necessary information from the table, and determines the voltage V1 corresponding to the paper size, the basis weight, the paper quality, and the absolute water content.

Figure 4:
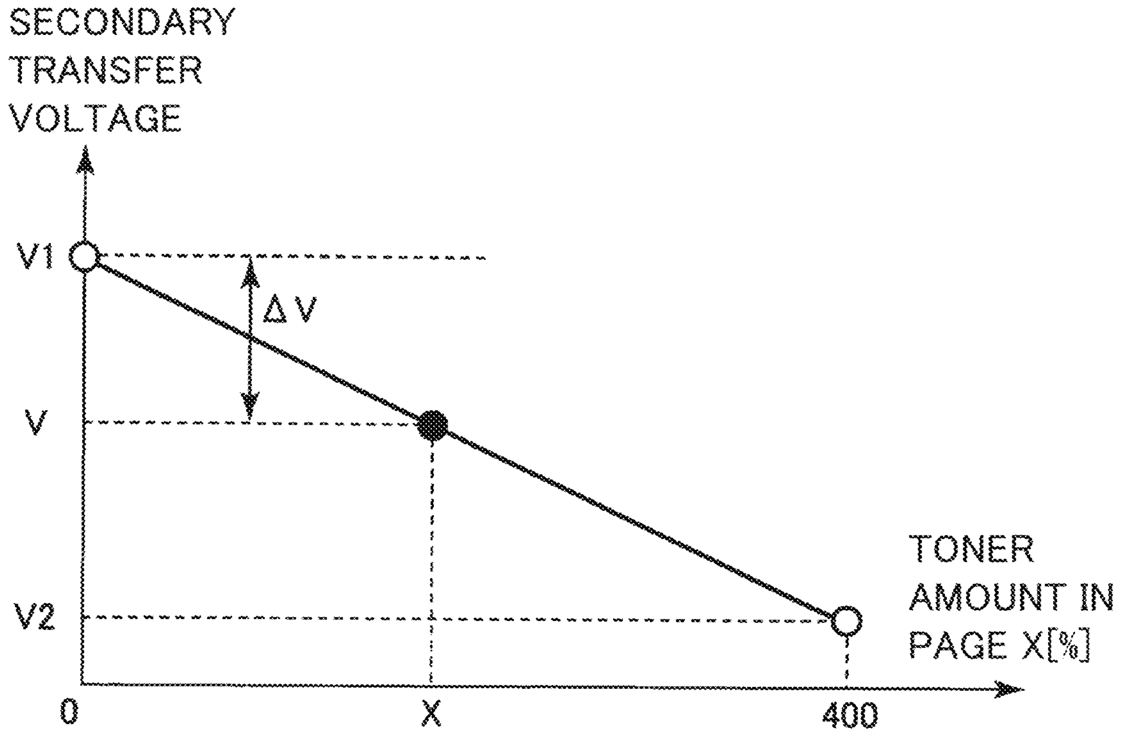
FIG. 4 is a graph for illustrating a secondary transfer voltage determining method in an embodiment 1.

Next, the determining method of the correction amount ΔV of the secondary transfer voltage (secondary transfer voltage determining method) in this embodiment will be described. FIG. 4 is a graph for illustrating the correction amount ΔV of the secondary transfer voltage in this embodiment. In FIG. 4, the abscissa represents the toner amount X in page, and the ordinate represents the secondary transfer voltage V which is actually applied. The toner amount X in page represented on the abscissa is capable of taking a value of 0-400 [%]. A voltage value at which the toner amount in page X=0 [%] holds is the voltage V1 which is a reference value of the secondary transfer voltage in this embodiment. Further, a voltage value at which the toner amount in page X=400 [%] holds is a voltage V2. Incidentally, in this embodiment, similarly as in the case of the voltage V1, the voltage V2 is determined on the basis of the information on the recording material P and the environmental information. That is, in this embodiment, for each kinds of the recording material P, information indicating a relationship of the voltage V2 with the paper size, the basis weight, the paper quality, and the absolute water content is preset and stored as a table in the ROM 151. Then, on the basis of the acquired information on the recording material P and the acquired environmental information, the CPU 221 calls up necessary information from the table, and determines the voltage V2 corresponding to the paper size, the basis weight, the paper quality, and the absolute water content.

As shown in FIG. 4, in this embodiment, as regards the voltage V1 in the toner amount in page X=0 [%], with an increasing toner amount X in page, an absolute value of the secondary transfer voltage which is actually applied is monotonously decreased. That is, the correction amount ΔV is a difference between the voltage V1 and the actually applied voltage V, and is determined (calculated) by a formula (2) show below. Incidentally, in this embodiment, determination (calculation) of the correction amount ΔV of the secondary transfer voltage is made by a secondary transfer voltage correction amount calculating portion 225 realized by the CPU 221 mounted in the CPU circuit portion 150 of the engine controller 210.

$$\Delta V=\{(V1-V2)/400\}\times X[\text{V}](0\leq X\leq 400) \quad (2)$$

Then, the secondary transfer voltage V is determined (calculated) by a formula (3) shown below so that the absolute value of the secondary transfer voltage is made smaller with an increasing toner amount X in page.

Incidentally, in this embodiment, determination (calculation) of the secondary transfer voltage with use of the correction amount ΔV is made by the CPU 221 mounted in the CPU circuit portion 150 of the engine controller 210.

$$V = V1 - \Delta V \quad (3)$$

In a table 1 shown below, as an example, a table of the voltage V1 and the voltage V2 for the plain paper is shown. In the table, the voltage V1 and the voltage V2 are set for the side (first side or second side) of the recording material Ponto which the toner image is transferred, the absolute water content, and the paper size. Incidentally, the paper size shows a width of the recording material P.

TABLE 1

| PQ*[1] | BW*[2] | PS*[3] | AWC*[4] | V*[5] | PAPER SIZE A5 148 mm | A4 210 mm | LTR 215.9 mm |
|---|---|---|---|---|---|---|---|
| P.P. | 75 g/m² | 1ST SIDE | 21.7 g/m³ | V1 | 1000 V | 1200 V | 1400 V |
| | | | | V2 | 900 V | 800 V | 1000 V |
| | | | 27.1 g/m³ | V1 | 1100 V | 1300 V | 1500 V |
| | | | | V2 | 900 V | 850 V | 1000 V |
| | | 2ND SIDE | 21.7 g/m³ | V1 | 1000 V | 1000 V | 1300 V |
| | | | | V2 | 950 V | 800 V | 900 V |
| | | | 27.1 g/m³ | V1 | 1000 V | 1200 V | 1450 V |
| | | | | V2 | 900 V | 800 V | 1000 V |

*[1]"PQ" represents a paper quality. "P.P." is plain paper.
*[2]"BW" represents a basis weight.
*[3]"PS" represents a paper side.
*[4]"AWC" represents an absolute water content.
*[5]"V" represents a voltage.

Incidentally, the voltage V1 and the voltage V2 for the paper size and the absolute water content which are not listed in the table 1 are determined by linear interpolation between the paper sizes listed in the table 1 and between the absolute water contents listed in the table 1. As regards the paper size, setting of LTR is selected for paper sizes which is not less than an LTR width (215.9 mm), and setting of A5 is selected for paper sizes not more than an A5 width (148.0 mm). Further, an A4 width is 210.0 mm. As regards the absolute water content, setting of 27.1 g/m³ is selected for absolute water contents not less than 27.1 g/m³, and in the case where the absolute water content is less than 21.7 g/m³, as described above, the constant-current control of the secondary transfer voltage is executed.

Subsequently, the reason why the difference (absolute value) between the voltage V1 and the voltage V2 in the table 1 is changed depending on the absolute water content, the paper side (first side or second side), and the width of the recording material P will be described.

First, the difference between the voltage V1 and the voltage V2 may preferably be made larger with a larger absolute water content. That is, a resistance is made lower with an increasing degree of moisture absorption. For that reason, in this embodiment, from a viewpoint of suppressing the patch void and the insufficient transfer, the difference between the voltage V1 and the voltage V2 is made larger with the larger absolute water content.

Secondly, the difference between the voltage V1 and the voltage V2 may preferably be made larger for the first side than for the second side. As regards the second side, the recording material P is once subjected to the fixing step, whereby heat is applied to the recording material P and a water content is vaporized, so that an electric resistance is increased. As a result, when compared with the first side, on the second side of the recording material P, the patch void and the insufficient transfer to not readily occur. For that reason, in this embodiment, the difference between the voltage V1 and the voltage V2 is made larger for the first side than for the second side.

Thirdly, the difference between the voltage V1 and the voltage V2 may preferably be made larger with a wider width of the recording material P. This is because in the case where a size of the isolated patch pattern described later is the same, an area ratio of the toner to a white portion becomes larger with a narrower width of the recording material P, and thus the patch void does not readily occur. For that reason, in this embodiment, the difference between the voltage V1 and the voltage V2 is made larger with the wider width of the recording material P.

Incidentally, the table 1 is an example for the plain paper, and depending on the kind of the recording material P, the degree of moisture absorption and the electric resistance of the recording material P itself vary. For that reason, depending on the kind of the recording material P, a table can be appropriately set. Incidentally, there is a tendency that the electric resistance is lower with a smaller basis weight of the recording material P. For that reason, from the viewpoint of suppressing the patch void and the insufficient transfer, the difference between the voltage V1 and the voltage V2 may preferably be made larger with the smaller basis weight of the recording material P. Further, in order to increase the difference (absolute value) between the voltage V1 and the voltage V2, it is possible to increase the absolute value of the voltage V1 or decrease the absolute value of the voltage V2, or it is possible to increase the absolute value of the voltage V1 and decrease the absolute value of the voltage V2. That is, at least one of the voltage V1 and the voltage V2 can be changed so that the absolute value of the difference between the voltage V1 and the voltage V2 becomes large.

A specific example of the secondary transfer voltage determining (calculating) method will be described. For example, the case where in an environment of 24.4 g/m³ in absolute water content, an image with a toner amount X in page is 160 [%] is formed on plain paper (width: 179 mm) by one-side printing will be considered.

First, the voltage V1 and the voltage V2 for the first side of each of the recording materials P having an A5 size (width: 148 mm) and an A4 size (width: 210 mm) in the environment of 24.4 g/m³ in absolute water content is acquired by linear interpolation between an absolute water content of 27.1 g/m³ and an absolute water content of 21.7 g/m³.

$$V1\,(A5\text{ size}) = 1000 + (1100 - 1000) \times (24.4 - 21.7)/(27.1 - 21.7) = 1050\,V$$

$$V1\,(A4\text{ size}) = 1200 + (1300 - 1200) \times (24.4 - 21.7)/(27.1 - 21.7) = 1250\,V$$

$$V2\,(A5\text{ size}) = 900 + (900 - 900) \times (24.4 - 21.7)/(27.1 - 21.7) = 900\,V$$

$$V2\,(A4\text{ size}) = 800 + (850 - 800) \times (24.4 - 21.7)/(27.1 - 21.7) = 825\,V$$

Then, the voltage V1 and the voltage V2 for the recording material P having the width of 179 mm are acquired by linear interpolation between the width of 148 mm and the width of 210 mm.

$$V1\,(\text{width: }179\text{ mm}) = 1050 + (1250-1050)\times(179-148)/(210-148) = 1150\ V$$

$$V2\,(\text{width: }179\text{ mm}) = 825 + (900-825)\times(179-148)/(210-148) = 862.5\ V$$

Subsequently, the correction amount ΔV for the toner amount in page X=160 [%] is acquired by linear interpolation between the toner amount in page $$X = 0\,[\%] \text{ and the toner amount in page } X = 400\,[\%].$$

$$\Delta V = \{(1150 - 862.5)/400\}\times 160 = 115\,[V]$$

Finally, the voltage V1 is corrected using the above-acquired correction amount ΔV, the secondary transfer voltage which is to be actually applied is acquired.

$$V = V1 - \Delta V = 1150 - 115 = 1035\,[V]$$

The CPU 221 carries out the secondary transfer by providing an instruction to the secondary transfer controller 202 so as to apply the above-determined (acquired) secondary transfer voltage from the secondary transfer voltage power source 21 to the secondary transfer roller 20.

Control Procedure

Figure 5:
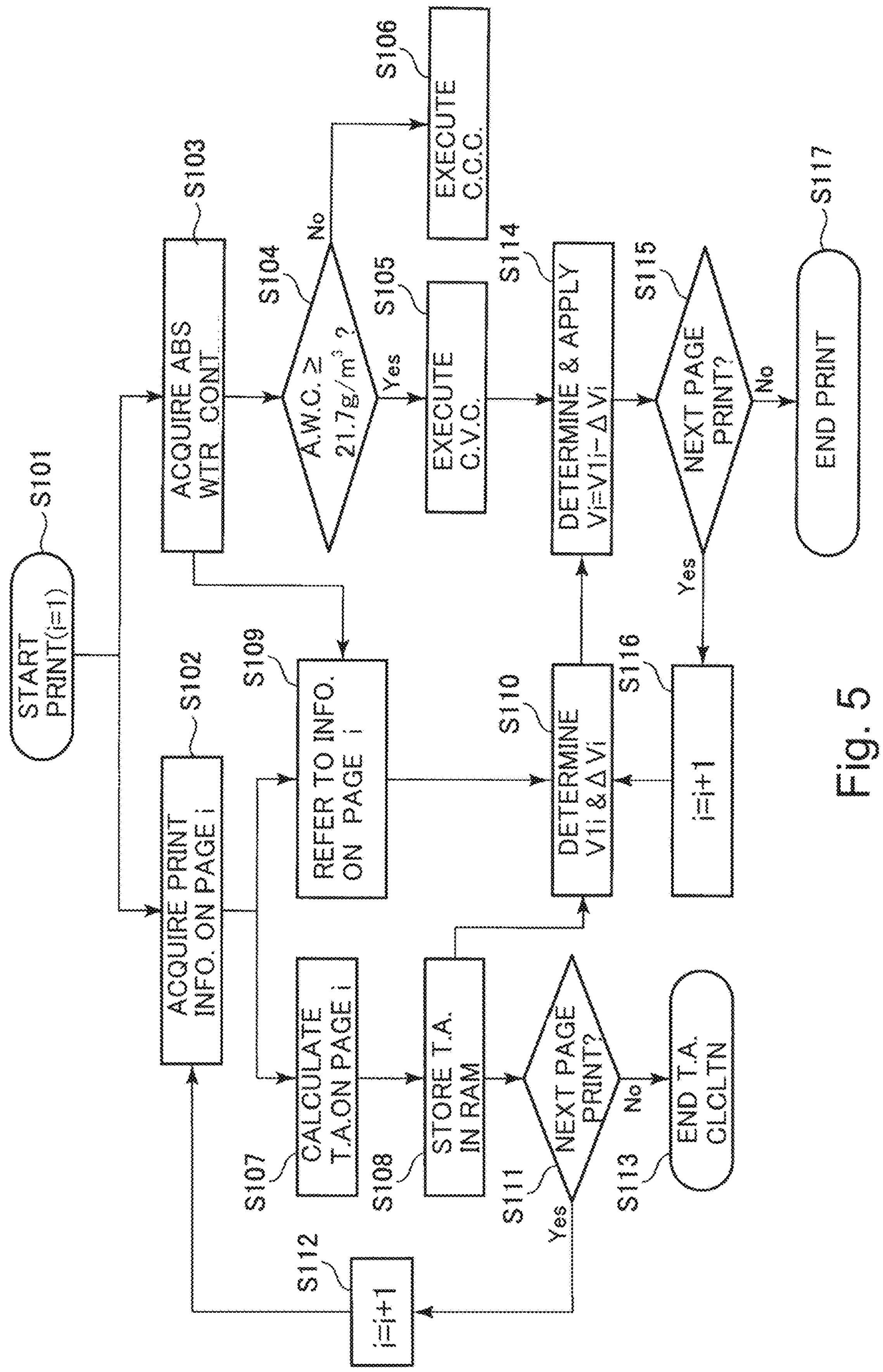
FIG. 5 is a flow chart showing a control procedure of a secondary transfer voltage.

FIG. 5 is a flowchart showing an outline of a control procedure of the secondary transfer voltage in this embodiment described hereinabove.

When the start instruction of the print job is inputted, the CPU 221 starts preparation of the image formation (S101). The control of the secondary transfer voltage in this embodiment starts from page i (print start (i=1)) of the print job. The CPU 221 acquires not only print information on page i from the host device 199 (S102), but also information on absolute water content from the detection result of the environmental sensor 300 (S103). The CPU 221 discriminates whether the control of the secondary transfer voltage is carried out through the constant-voltage control or the constant-current control, on the basis of the information on the absolute water content (S104). In this embodiment, in the case where the absolute water content is 21.7 g/m$^3$ or more, the constant-voltage control is carried out (S105), and in the case where the absolute water content is less than 21.7 g/m$^3$, the constant-current control is carried out (S106). This embodiment has a feature in control when the constant-voltage control of the secondary transfer voltage is executed, and therefore, the control when the constant-voltage control of the secondary transfer voltage is executed will be described.

The CPU 221 determines the above-described secondary transfer voltage control method, while measures the toner amount X (0-400%) on page i by the above-described method on the basis of the print information from the host device 199 (S107). That is, the video signal from the controller 200 is sent to the image processing GA 222 via the video interface portion 220 and is converted to a laser driving signal, so that the toner amount X (0-400%) on page i is measured. The CPU 221 causes the RAM 152 to store the toner amount X (0-400%) on page i (S108). On the basis of the toner amount X on page i stored in the RAM 152, the print information on page i, and the information on the absolute water content acquired from the detection result of the environmental sensor 300 (S109), the CPU 221 calculates the voltage V1 and the correction amount ΔV corresponding to the toner amount X (S110). Further, in parallel thereto, in the case where printing on a subsequent page is required, the CPU 221 measures the toner amount X on page i+1 and causes the RAM 152 to store the toner amount X on page i+1, and similarly as in the case of the page i, the CPU 221 determines the voltage V1 for page i+1 and the correction amount ΔV for page i+1 (S111, S112, S113).

After the voltage V1 for page i and the correction amount ΔV corresponding to the toner amount X are determined, at timing when the recording material P passes through the secondary transfer portion N2, the CPU 221 causes the secondary transfer power source to apply the secondary transfer voltage V (=V1−ΔV) (S114), and the ends the printing on page i. In the case where subsequent printing is required, the CPU 221 causes the secondary transfer power source to apply the secondary transfer voltage V (=V1−ΔV) for page i+1 determined in advance as described above similarly as in the above-described case, and the ends the print job (S115, S116, S117).

Functional Effect

Next, in the constant-voltage control of the secondary transfer voltage, a functional effect of control in which the absolute value of the secondary transfer voltage is made smaller with a larger toner amount X on (one) page (i.e., the absolute value of the secondary transfer voltage is made larger with a smaller toner amount X on page) will be described. Part (a) of FIG. 6 is a schematic view showing an example of an image including an isolated patch pattern, and part (b) of FIG. 6 is a schematic view showing an example of an overall solid image (for example, overall solid black image). Further, part (c) of FIG. 6 is a schematic view of a cross-section of the secondary transfer portion N2 during secondary transfer of the image including the isolated patch pattern, and part (d) of FIG. 6 is a schematic view of a cross-section of the secondary transfer portion N2 during secondary transfer of the overall solid image (for example, the overall solid black image). The parts (c) and (d) of FIG. 6, arrows represent paths of the transfer current, and a thickness of each arrow schematically represents a magnitude of the transfer current. Incidentally, as described above, the "isolated patch pattern" means the image pattern such that the cluster of the high print-ratio toner image is interspersed in the width of the recording material P. Further, the "overall solid image (overall solid pattern)" means the image pattern such that the toner image with the maximum density level is present over the entirety of the image formable region with respect to the widthwise direction of the recording material P.

In this embodiment, the constant-voltage control of the secondary transfer voltage is executed in the high-temperature/high-humidity environment. Further, in the high-temperature/high-humidity environment, the recording material P, the secondary transfer roller 20, the intermediary transfer belt 10, and the like lower in electric resistance by moisture absorption.

Accordingly, in the case where a low print-ratio image including the isolated patch pattern small in toner amount X in page as shown in part (a) of FIG. 6 is transferred, the following phenomenon occurs. That is, the transfer current is liable to flow through a low-resistance white portion, not a high-resistance toner portion (patch portion) T as shown in part (c) of FIG. 6, and the transfer current does not readily flow through the toner portion (patch portion) T. At this time, according to the control in this embodiment, the absolute value of the secondary transfer voltage can be made larger with a smaller toner amount X on page, and therefore, a total current amount of the secondary transfer current can be increased. That is, although the current flowing through the white portion increases, at the same time, the current flowing through the toner portion (patch portion) T also increases, and therefore, it becomes possible to cause a current sufficient to perform the secondary transfer to flow through the toner portion (patch portion) T, with the result that the "patch void" can be suppressed.

Conventionally, as shown in part (b) of FIG. 6, in the case where a high print-ratio image including the overall solid image or the like large in toner amount X on page is transferred, the following phenomenon occurs. That is, there is no escape route of the transfer current, and therefore, when the constant-voltage control is executed at a voltage value large in absolute value in consideration of an escape current to the white portion in order to suppress the "patch void", supply of the current to the toner portion T becomes excessive. At this time, according to control in this embodiment, the absolute value of the secondary transfer voltage can be made smaller with an increasing toner amount X on page, and therefore, it is possible to suppress excessive supply of the current to the toner portion T, with the result that the "insufficient transfer" can be suppressed.

In accordance with the above-described mechanism, ideally, it is preferable that the correction amount ΔV of the secondary transfer voltage is changed depending on the toner amount of the toner existing in the secondary transfer portion N2 and an area of the toner portion. That is, it is preferable that the absolute value of the secondary transfer voltage is made small when the toner amount of the toner existing in the secondary transfer portion N2 or an area coverage ratio of the toner portion is large and is made large when the toner amount or the area coverage ratio of the toner portion is small. However, when control such that the voltage is increased and decreased frequently in one page during execution of the constant-voltage control is carried out, the secondary transfer voltage cannot flow the control due to a limit of responsiveness of the secondary transfer power source 21, with the result that there is a possibility that an optimum secondary transfer voltage depending on the image pattern cannot be applied. Accordingly, in this embodiment, in order to averagely improve an image quality, the secondary transfer voltage is corrected depending on the toner amount X on page.

Here, a secondary transfer voltage application (changing) timing will be further described. Parts (a) and (b) of FIG. 7 are timing charts each for illustrating an application timing of the secondary transfer voltage. In FIG. 7, the abscissa represents a time, and the ordinate represents a voltage. Incidentally, a period in which the recording material P (specifically, an image formable region thereof) exists in the secondary transfer portion N2 is also referred to as "during sheet (paper) passing", which is a period corresponding to during image formation (during secondary transfer) in the secondary transfer portion N2. Further, a period between a recording material P and a subsequent recording material P is also referred to as a "sheet (paper) interval", which is a period corresponding to the above-described sheet (paper) interval step in the secondary transfer portion N2. Further, in FIG. 7, during non-image formation (corresponding to the above-described pre-rotation step) prior to the "during sheet passing" for page one is also referred to as the "sheet interval" for convenience.

Part (a) of FIG. 7 shows the application timing of the secondary transfer voltage in this embodiment. In this embodiment, only a timing (during sheet passage) when the recording material P passes through the secondary transfer portion N2, a secondary transfer voltage (V=V1−ΔV) is applied. Further, in this embodiment, at another timing (sheet interval), a sheet interval voltage smaller in absolute value than the secondary transfer voltage (V=V1−ΔV) is applied. This is for the following two reasons. First reason is because whether to actually apply a secondary transfer voltage Vi for page i, described with reference to FIG. 5, at which timing is influenced by a communication condition between the host device 199 and the controller 200 and the process speed of the image forming apparatus 100. That is, it is not known that the secondary transfer voltage Vi can be determined at which timing, and therefore, the sheet interval voltage is applied until immediately before application of the secondary transfer voltage for page i, so that it is possible to prepare for determination of the secondary transfer voltage Vi for during sheet passing. Second reason is because when the secondary transfer voltage large in absolute value is applied in a state in which the recording material P does not exist in the secondary transfer portion T2, a load on the secondary transfer power source 21 becomes heavy, and therefore, there is a possibility of oscillation in some cases.

For these reasons, in this embodiment, at the timing (during sheet interval) when the recording material P does not exist in the secondary transfer portion N2, the sheet interval voltage smaller in absolute value than the secondary transfer voltage during sheet passing is applied. However, in the case where the secondary transfer voltage determining timing is sufficiently early and responsiveness of the secondary transfer power source 21 to the control or in the like case, for example, as shown in part (b) of FIG. 7, the secondary transfer voltage for page i is applied during the sheet interval and may prepare for application during the sheet passing.

Further, the secondary transfer voltage application timing depending on the toner amount will be specifically described. In this embodiment, control such that the secondary transfer voltage applied in a period (at a timing when an image formable region of the recording material P with respect to the recording material feeding direction passes through the secondary transfer portion N2) in which there is a possibility that the toner exists is changed depending on the toner amount from a viewpoint of suppressing the patch void and the insufficient transfer is carried out. Further, in this embodiment, as regards a voltage applied at a timing when a marginal portion of a leading end portion or a trailing end portion of the recording material P on which the toner does not exist, the above-described control such that the secondary transfer voltage is changed depending on the toner amount. Incidentally, the leading end (portion) and the trailing end (portion) of the recording material P refer to the leading end (portion) and the trailing end (portion), respectively, with respect to the feeding direction of the recording material P. In this embodiment, at timings when the leading end and the trailing end of the recording material P pass through the secondary transfer portion N2, a leading end voltage and a trailing end voltage which are different from the secondary transfer voltage (V=V1−ΔV) described above are applied. This is for the following reason. That is, at the leading end of the recording material P, a state thereof is changed from a low impedance state in which the recording material P is absent in the secondary transfer portion N2 to a high impedance state in which the recording material P abruptly enters the secondary transfer portion N2. For that reason, the leading end voltage such that the transfer voltage does not become insufficient is applied. Further, at the trailing end of the recording material P, contrary to the above, the state of the recording material P is changed from the high impedance state to a state in which the impedance gradually lowers by passing of the recording material P through the secondary transfer portion N2. For that reason, at the trailing end of the recording material P, the trailing end voltage such that the transfer voltage does not become insufficient is applied. However, in the case where there is no marginal portion or there is a possibility that the marginal portion is narrow and the toner exists to the neighborhood of the leading end and the trailing end of the recording material P, also as regards the secondary transfer voltages applied for the leading end and the trailing end of the recording material P, the correction of the secondary transfer voltage depending on the toner amount in accordance with this embodiment may also be made. Incidentally, each of the leading end voltage and the trailing end voltage is a predetermined voltage set in advance from the above-described viewpoint. The predetermined voltage is determined on the basis of the information on the recording material and the environmental information similarly as in the cases of the above-described voltages V1 and V2, for example. That is, for example, for each of kinds of the recording materials P, information indicating a relationship of the leading end voltage and the trailing end voltage with the paper (sheet) size, the basis weight, the paper (sheet) quality, and the absolute water content is stored as a table in the ROM 151. Then, the CPU 221 calls up necessary information from the table on the basis of the acquired information on the recording material P and the acquired environmental information, and then determines the leading end voltage and the trailing end voltage each corresponding to the paper size, the basis weight, the paper quality and the absolute water content. Typically, each of the leading end voltage and the trailing end voltage is larger in absolute value than the above-described secondary transfer voltage ($V=V1-\Delta V$). However, at least one of the leading end voltage and the trailing end voltage which are set as described above may be substantially the same as the above-described secondary transfer voltage ($V=V1-\Delta V$) in some cases.

Incidentally, in this embodiment, in an environment in which the absolute water content is less than 21.7 $g/m^3$, an electric resistance of the recording material P is high to the extent that an escape current to the white portion does not generate, and therefore, the "constant-current control" of the secondary transfer voltage is executed. In this environment, even in the image patterns as shown in parts (a) and (b) of FIG. 6, the transfer current can be substantially uniformly supplied along the widthwise direction of the recording material P so as to provide an appropriate secondary transfer voltage by the "constant-current control".

Thus, in this embodiment, the image forming apparatus 100 includes the image bearing member 10 for bearing the toner image, the transfer member 20 for forming the transfer portion N2 where the toner image is transferred from the image bearing member 10 onto the recording material P, the applying portion 21 for applying the transfer voltage to the transfer member 20, and the controller (engine controller) 210 for controlling the applying portion 21. Further, in this embodiment, when the transfer voltage is subjected to the constant-voltage control so that the voltage applied to the transfer member 20 by the applying portion 21, the controller 210 carries out control so that the transfer voltage is a first voltage in the case where the toner amount used for the toner image is a first toner amount and is a second voltage smaller in absolute value than the first voltage in the case where the toner amount is a second toner amount larger than the first toner amount. In this embodiment, the image forming apparatus 100 includes an acquiring portion (CPU) 221 for acquiring toner amount information relating to the above-described toner amount, and the exposure portion 3 for exposing another image bearing member, for bearing the toner to be transferred onto the image bearing member 10, to light depending on the image information, and the acquiring portion 221 acquires toner amount information on the basis of a driving signal for causing the exposure portion 3 to emit light depending on the image information. Further, in this embodiment, the toner amount information relating to the toner amount is acquired for each toner image to be transferred onto a single recording material P.

Here, the controller 210 is capable of changing at least one of the first voltage and the second voltage so that an absolute value of a difference between the first voltage and the second voltage becomes large in the case where a basis weight of a recording material P, on which the toner image is to be transferred, capable of being a first basis weight and a second basis weight smaller than the first basis weight is the second basis weight. Further, the controller 210 is capable of changing at least one of the first voltage and the second voltage so that the absolute value of the difference between the first voltage and the second voltage becomes large in the case where a width of the recording material P, with respect to a direction substantially perpendicular to the recording material feeding direction, capable of being a first width and a second width larger than the first width is the second width. Further, the image forming apparatus 100 may be capable of executing an operation in which a recording material on which first side the toner image is transferred is conveyed to the transfer portion N2 where the toner image is transferred onto the second side of the recording material P, and in this case, the controller 210 is capable of changing at least one of the first voltage and the second voltage so that an absolute value of a difference between the first voltage and the second voltage becomes larger during the transfer of the toner image onto the first side than during the transfer of the toner image onto the second side. Further, the image forming apparatus 100 may include the environment detecting portion 300 for detecting the environmental information relating to at least one of the ambient temperature and the ambient humidity, and in this case, the controller 210 is capable of changing at least one of the first voltage and the second voltage so that the absolute value of the difference between the first voltage and the second voltage becomes large in the case where an ambient absolute water content, indicated by a detection result of the environment detecting portion 300, capable of being a first absolute water content and a second absolute water content larger than the first absolute water content is the second absolute water content.

Further, in this embodiment, the controller 210 carries out control so that the absolute value of the transfer voltage is gradually made smaller with an increasing toner amount between a transfer voltage in the case where the toner amount is minimum and a transfer voltage in the case where the toner amount is maximum. Further, in this embodiment, the controller 210 is capable of subjecting the transfer voltage to the constant-current control so that a current supplied to the transfer member 20 by the applying portion 21 becomes substantially constant, and subjects the transfer voltage to the constant-voltage control in the case where the absolute water content indicated by the detection result of the environment detecting portion 300 is a predetermined value or more and subjects the transfer voltage to the constant-current control in the case where the absolute water content indicated by the detection result of the environment detecting portion 300 is less than the predetermined value.

As described above, according to this embodiment, when the secondary transfer voltage is subjected to the constant-voltage control in the environment, such as the high-temperature/high-humidity environment, in which it is difficult to compatibly realize suppression of the patch void and suppression of the insufficient transfer, an appropriate secondary transfer voltage can be set. Further, as described above, in this embodiment, even in an environment other than the high-temperature/high-humidity environment, an appropriate secondary transfer voltage can be supplied by subjecting the secondary transfer voltage to the constant-current control. Accordingly, according to this embodiment, even when the image forming apparatus 100 is used in any environment in a usable range, good secondary transfer can be carried out.

Confirmation of Effect

In order to confirm an effect of this embodiment, in a high-temperature (high-humidity environment (temperature: 30° C./relative humidity: 80% RH/absolute water content: 21.7 g/m$^3$), a test for verifying occurrence or non-occurrence of an image defect was conducted. As the recording material P, paper ("XEROX Business 4200 Paper" letter size (trade name), manufactured by Xerox Corp.) was used. The test was conducted for constitutions of this embodiment (embodiment 1), a comparison example 1, and a comparison example 2. In the constitution of this embodiment, the voltage V1 was 1400 V, and the voltage V2 in toner amount in (one) page X=400 [%] was 1000 V.

In each of the constitutions of the comparison examples 1 and 2, a substantially constant secondary transfer voltage was applied irrespective of the toner amount X in page. In the constitution of the comparison example 1, as the secondary transfer voltage, 1400 V which is the same as the voltage V1 in this embodiment was applied. Further, in the constitution of the comparison example 2, as the secondary transfer voltage, 1000 V which is the same as the voltage V2 in this embodiment was applied. The constitutions of the comparison examples 1 and 2 are substantially the same as the constitution of this embodiment except that the above-described points are different from this embodiment.

An evaluation result is shown in table 2 appearing hereinafter. In the table 2, an applied voltage V for a low print-ratio image (X=5 [%]), an applied voltage V for a high print-ratio image (X=300 [%]), and image levels (patch void in the low print-ratio image, and insufficient transfer in the high print-ratio image) in each case are shown. The image levels are classified as three ranks of Good, Fair (somewhat poor), and Poor. Further, the ranks of Fair (somewhat poor) and Poor are discriminated such that the image defect occurred.

TABLE 2

| | V1 | V2 | x = 5[%] V | x = 300[%] V | PV*1 | IT*2 |
|---|---|---|---|---|---|---|
| EMB. 1 | 1400 V | 1000 V | 1395 V | 1100 V | Good | Good |
| COMP. EX. 1 | 1400 V | 1400 V | 1400 V | 1400 V | Good | Poor |
| COMP. EX. 2 | 1000 V | 1000 V | 1000 V | 1000 V | Poor | Good |

*1 "PV" is the patch void.
*2 "IT" is the insufficient transfer.

In the constitution of the comparison example 1, in the low print-ratio image including an isolated patch pattern, a sufficient current can be supplied to the toner portion (patch portion), and therefore, the "patch void" did not occur. However, in the constitution of the comparison example 1, in the high print-ratio image including a solid image, an absolute value of the secondary transfer voltage becomes large and thus a current is excessively supplied, so that the "insufficient transfer" occurred.

In the constitution of the comparison example 2, setting of the secondary transfer voltage in which the current is not excessively supplied in the high print-ratio image including the solid image is made, and therefore, the "insufficient transfer" did not occur. However, in the comparison example 2, in the low print-ratio image including the isolated patch pattern, the sufficient current cannot be supplied to the toner portion (patch portion), and therefore, the "patch void" occurred.

On the other hand, in the constitution of this embodiment, in the low print-ratio image including the isolated patch pattern, the absolute value of the secondary transfer voltage can be made large, and the sufficient current can be supplied to the toner portion (patch portion), and therefore, the "patch void" did not occur and thus a good transfer property was obtained. Further, in the constitution of this embodiment, in the high print-ratio image including the solid image, the absolute value of the secondary transfer voltage can be made small and it is possible to suppress that the current flows more than necessary, and therefore, the "insufficient transfer" did not occur and thus the good transfer property was obtained.

Incidentally, in either of this embodiment (embodiment 1), the comparison example 1, and the comparison example 2, in the environment of the absolute water content of less than 21.7 g/m$^3$, the "constant-current control" of the secondary transfer voltage is executed, and therefore, the same transfer property was obtained.

In this embodiment, the calculation of the toner amount and the correction of the secondary transfer voltage were carried out for (one) page, but the present invention is not limited thereto. For example, the calculation of the toner amount and the correction of the secondary transfer voltage may also be carried out in an arbitrary cyclic period every predetermined rotation amount (for example, one full-circumference) of the secondary transfer roller 20, every predetermined rotation amount (for example, one full-circumference) of the photosensitive drum 1, or the like. Or, as described above, ideally, the secondary transfer voltage may preferably be changed depending on the toner amount in the secondary transfer portion N2. For that reason, for example, in a constitution in which responsiveness of the secondary transfer power source is sufficiently fast, the secondary transfer voltage may be changed depending on the toner amount in the secondary transfer portion N2.

In this embodiment, in the engine controller 210, the laser driving signal is sampled and the pixel current value n (the number of times of "H"), so that the toner amount is calculated, but the present invention is not limited thereto. For example, image information (toner amount information) is sent together with the video signal from the controller 200 to the engine controller 210, and then the correction amount of the secondary transfer voltage may be determined on the basis of the information in the engine controller 210. Further, in this embodiment, the toner amount is calculated by a pixel count value for the four colors to the total sampling number per (one) color, but the present invention is not limited thereto. For example, for each paper size, the pixel count value corresponding to the overall solid image (for example, an overall solid black image) is stored as a constant in the RAM 152, and then the toner amount may be calculated from a ratio of the number to an actual pixel count value.

In this embodiment, on the basis of the detection result of the absolute water content by the environmental sensor 300, whether to execute the "constant-voltage control" of the secondary transfer voltage or the "constant-current control" of the secondary transfer voltage is determined, but the present invention is not limited thereto. For example, whether to execute the "constant-voltage control" of the secondary transfer voltage or the "constant-current control" of the secondary transfer voltage may be discriminated by measuring the impedance of the secondary transfer portion N2 (the secondary transfer roller 20 and the intermediary transfer belt 10) before the image formation. Specifically, device non-image formation (in the pre-rotation step or the pre-multi-rotation step) before the image forming step of the print job, a predetermined current is caused to flow through the secondary transfer portion N2 and a voltage value of the voltage applied at that time is measured, so that the impedance is measured. Incidentally, a predetermined voltage is applied and a current value of a current flowing at that time is measured, so that the impedance may be measured. Then, in the case where the measured impedance is small, electric resistance values of the secondary transfer roller 20 and the intermediary transfer belt 10 lower, and therefore, it would be considered that an electric resistance value of the recording material P similarly lowers. Accordingly, the "constant-voltage control" of the secondary transfer voltage is executed in the case where the impedance is lower than a predetermined threshold, and the correction of the secondary transfer voltage according to this embodiment may only be required to be made. Incidentally, as an index correlating with the impedance other than the above-described impedance itself, the voltage value when the above-described predetermined current is caused to flow or the current value when the above-described predetermined voltage is applied may be used in the above-described control. Or, for example, for each kind of the recording material P, information indicating both of a relationship between a lower limit voltage value of the secondary transfer voltage with the paper size the basis weight, the paper quality, and the absolute water content and a relationship between a target current value during the secondary transfer with the paper size, the basis weight, the paper quality, and the absolute water content is set in advance and is stored in the ROM 151 Then, during the secondary transfer, the transfer current with the target current value is caused to flow, and in the case where the voltage value at that time is below the lower limit voltage value, the "constant-voltage control" at the lower limit voltage value may be executed. That is, the image forming apparatus 100 may include the resistance detecting portions (current detecting portion, voltage detecting portion) 241 and 242, and in this case, the controller 210 is capable of executing the constant-voltage control of the transfer voltage when the electric resistance of the transfer portion N2 indicated by the resistance detecting portions 241 and 242 is lowered than a predetermined value, and is capable of executing the constant-current control of the transfer voltage when the electric resistance of the transfer portion N2 indicated by the resistance detecting portions 241 and 242 is the predetermined value or more. Or, the controller 210 may execute the constant-voltage control of the transfer voltage when the applied voltage of the applying portion 21 becomes smaller than the predetermined value through the constant-current control of the transfer voltage.

In this embodiment, the secondary transfer voltage is calculated as V=V1−ΔV from the voltage V1 and the correction amount ΔV, but the present invention is not limited thereto. For example, as in the image forming apparatus 100 of FIG. 8, there is a constitution in which the primary transfer current is capable of being supplied from the secondary transfer power source 21. In the case of such a constitution, a further correction is required for determining the secondary transfer voltage V. Incidentally, in the image forming apparatus 100 of FIG. 8, elements having the same or corresponding functions and constitutions of those of the image forming apparatus 100 of FIG. 1 are represented by the same reference numerals or symbols. In the image forming apparatus 100 of FIG. 8, the secondary transfer opposite roller 13 (further the driving roller 11 and the tension roller 12) and the respective primary transfer rollers 14 are connected to the ground potential through a Zener diode 17 as a voltage retaining element (voltage stabilizing element). By this, a voltage not less than a predetermined value is supplied from the secondary transfer power source 21, so that a primary transfer current can be supplied to each of the primary transfer rollers 14 while maintaining the potentials of each of the primary transfer rollers 14 (and the secondary transfer opposite roller 13) at predetermined potentials. Incidentally, as the voltage stabilizing element (voltage retaining element) for stabilizing a primary transfer voltage Vt1, the element is not limited to the Zener diode 17, but when a similar effect can be obtained, for example, another voltage stabilizing element such as a varistor may be used. In the constitution as shown in FIG. 8, the primary transfer voltage Vt1 is applied to the secondary transfer opposite roller 13. For that reason, an execution voltage for the secondary transfer is a difference between the voltage applied to the secondary transfer roller 20 and the voltage applied to the secondary transfer opposite roller 13. Accordingly, the secondary transfer voltage to be actually applied is needed to be set at a value calculated by the following formula (4) in consideration of the primary transfer voltage Vt1.

$$V=(V1-\Delta V)+Vt1 \tag{4}$$

In this embodiment, relative to the change in toner amount X, the correction amount of the secondary transfer voltage is linearly changed, but the present invention is not limited thereto, and the correction amount of the secondary transfer voltage may be changed by an arbitrary curve.

In this embodiment, the normal charge polarity of the toner is the negative polarity, but the present invention is not limited thereto, and the normal charge polarity of the toner may be the positive polarity. In that case, the polarity of the biases such as the secondary transfer voltage is opposite to the polarity in this embodiment. Further, in that case, an increase/decrease relationship of the secondary transfer voltage values including signs of the secondary transfer voltages in the control is opposite to that in this embodiment, but an increase/decrease relationship of the absolute values of the secondary transfer voltages is the same as that in this embodiment.

Further, in this embodiment, the image forming apparatus 100 employed the constitution using the toners of the four colors of Y, M, C and K, but the present invention is not limited thereto. The image forming apparatus 100 may also employ a constitution in which in addition to Y, M, C and K or in place of either one of these colors, transparent toner, metallic toner, and the like are used. In that case, a maximum value of the toner amount X is not limited to 400 [%] in this embodiment, but may also be changed in conformity with a total amount of the toner of an associated kind used.

Next, another embodiment of the present invention will be described. Basic constitution and operation of an image forming apparatus of an embodiment 2 are the same as those of the image forming apparatus of the embodiment 1. Accordingly, in the image forming apparatus of the embodiment 2, as regards elements having the same or corresponding functions and constitutions as those in the image forming apparatus of the embodiment 1, reference numerals or symbols which are the same as those in the embodiment 1 are added and detailed description thereof will be omitted.

In the embodiment 1, relative to the reference secondary transfer voltage V1, correction such that the absolute value of the secondary transfer voltage is monotonously decreased with the increasing toner amount X in page was made. In this embodiment, there is a section of the toner amount X in which the absolute value of the secondary transfer voltage is made substantially constant relative to the change in toner amount X in page.

The determining method of the correction amount ΔV of the secondary transfer voltage in this embodiment will be described. FIG. 9 is a graph for illustrating the correction amount ΔV of the secondary transfer voltage in this embodiment. In FIG. 9, the abscissa represents the toner amount X in page, and the ordinate represents the secondary transfer voltage V which is actually applied. The toner amount X in page represented on the abscissa is capable of taking a value of 0-400 [%]. A voltage value in a section (section a) in which the toner amount X in page is 0≤X≤A [%] is V1. Further, a voltage value in a section (section c) in which the toner amount X is page is B≤X≤c is V2. Further, a voltage value in a section (section e) in which the toner amount X in page is D≤X (D≤X≤400 [%]) is V3. Here, a relationship between V1, V2 and V3 is V1>V2>V3. Further, a voltage value in a section of A<X<B (section b) is determined by linear interpolation between the voltage V1 and the voltage V2. Further, a voltage value in a section of C<X<D (section d) is determined by linear interpolation between the voltage V2 and the voltage V3.

That is, the correction amounts ΔV are represented by the following formula (5).

$$\Delta V = 0 \quad (0 \le X \le A) \tag{5}$$

$$\Delta V = V1 - \{(V2 - V1)/(B - A) \times (X - B) + V2\} \quad (A < X < B)$$

$$\Delta V = V1 - V2 \quad (B \le X \le C)$$

$$\Delta V = V1 - \{(V3 - V2)/(D - C) \times (X - D) + V3\} \quad (C < X < D)$$

$$\Delta V = V1 - V3 \quad (D \le X \le 400)$$

Thus, in this embodiment, in the case where the toner amount X is larger than the toner amount X in the section in which the voltage value is V1, correction such that the absolute value of the secondary transfer voltage is decreased is made. Further, in other words, in this embodiment, correction such that the absolute value of the secondary transfer voltage is increased in the case where the toner amount X is smaller than the toner amount X in the section in which the voltage value is V2 and is decreased in the case where the toner amount X is larger than the toner amount X in the section in which the voltage value is made. In this embodiment, the voltage V1 and the voltage V2 can be considered as the reference values of the secondary transfer voltage.

Incidentally, in this embodiment, the voltages V1, V2 and V3 and the toner amounts A, B, C and D are determined on the basis of the information on the recording material P and the environmental information. That is, in this embodiment, for each kinds of the recording material P, information indicating a relationship of the voltages V1, V2 and V3 and the toner amounts A, B, C and D with the paper size, the basis weight, the paper quality, and the absolute water content is preset and stored as a table in the ROM 151. Then, on the basis of the acquired information on the recording material P and the acquired environmental information, the CPU 221 calls up necessary information from the table, and determines the voltages V1, V2 and V3 and the toner amounts A, B, C and D each corresponding to the paper size, the basis weight, the paper quality, and the absolute water content.

Next, a functional effect of this embodiment will be described. In general, the "patch void" is liable to occur in a very low print-ratio printing, whereas the "insufficient transfer" has a possibility of an occurrence even in the case of an overall half-tone image or the like without being limited to the case of the overall solid image as shown in part (b) of FIG. 6. Here, the overall half-tone image is an image such that the toner amount is averagely smaller than the toner amount of the overall solid image as shown in part (b) of FIG. 6. The overall half-tone image is typically an image with a toner amount X of 20-100%. The overall half-tone image is liable to cause the "insufficient transfer" in the same mechanism as the mechanism described in the embodiment 1. That is, the "patch void" is liable to occur in a section in which the toner amount is very small and which is a narrow print amount section with a very low print-ratio, whereas the "insufficient transfer" is liable to occur in a section in which the toner amount as a medium level and which is a relatively wide print amount section.

As result of study by the present inventors, it turned out that the "patch void" is liable to occur in the toner amount X of about 0-20%, whereas the "insufficient transfer" is liable to occur in the toner amount X of about 100% or more. Further, in the case of the overall half-tone image, it turned out that the "insufficient transfer" is liable to occur even in the toner amount X of about 20% or more. Further, in the case of the image such that a wide area of the page is coated with the toner and the isolated patch pattern exists only at a part of the page, it turned out that the "patch void" occurs in some instances even in the toner amount X of about 20% or more. That is, it turned out that there is a possibility that both the "insufficient transfer" and the "patch void" occur in the section of the toner amount X of about 20-100% depending on the image pattern.

Accordingly, an appropriate transfer voltage is different for each of sections of the toner amounts X corresponding to a low print amount, a medium print amount, and a high print amount, and the case where it is not so preferable that the transfer voltage is changed for each section exists.

Further, as regards the very low print-ratio printing, also from the viewpoint of a load on the secondary transfer power source 21 describe later, in some cases, it is not preferable that the transfer voltage is changed.

In view of the above, it turned out that the values A, B, C and D for determining a section of the toner amount X of 0% to A in which the voltage V1 for suppressing the patch void in the very low print-ratio printing is applied, a section of the toner amount X of B to C in which the voltage V2 for suppressing both the patch void and the insufficient transfer in the print amount of the medium level, and a section of the toner amount X of D or more (D to 400%) may preferably fall within the following value ranges. That is, it turned out that it is preferable that the value A is 3-10% for suppressing the patch void, the value B is 15-20%, the value C is 75-90% for suppressing both the insufficient transfer and the patch void, and the value D is 95% or more (typically, 150% or less) for suppressing the insufficient transfer.

Therefore, in this embodiment, in order to suppress the patch void in the very low print-ratio printing, the voltage V1 (the voltage large in absolute value at which the patch void does not occur) in a section of the toner amount X satisfying 0≤X≤A=% [%] was set. Further, in order to suppress the insufficient transfer and the patch void in the case where the image such as the overall half-tone image coated with the toner in a wide area of the page exists or the isolated patch pattern exists at a part of the page, the voltage V2 (the voltage at which both the patch void and the insufficient transfer do not readily occur) in a section of the toner amount X satisfying B=20≤X≤C=80 [%] was set. Further, in order to suppress the insufficient transfer in the high print-ratio printing, the voltage V3 (the voltage at which the insufficient transfer of the solid image of a single color or more does not occur was set. As a result, compared with the control of the embodiment 1, it becomes possible to set a more appropriate voltage value for each of the image defects, so that a better transfer property compared with the embodiment 1 was able to be obtained.

In the following, as an example, set values of the voltages V1, V2 and V3 in the case where the absolute water content for the first side of the plain paper in this embodiment is 21.7 g/m$^3$ are represented by the following formula (6).

$$V = V1 = 1400\text{ V } (0 \le X \le 5\%) \tag{6}$$

$$V = (V2 - V1)/(B - A) \times (X - B) + V2 \; (5\% < X < 20\%)$$

$$V = V2 = 1000\text{ V } (20\% \le X \le 80\%)$$

$$V = (V3 - V2)/(D - C) \times (X - D) + V3 \; (80\% < X < 100\%)$$

$$V = V3 = 900\text{ V } (100\% \le X \le 400\%)$$

The patch void is a phenomenon which occurs in a low print-ratio image such as the isolated patch pattern and which occurs due to escape of the transfer current to the white portion. For that reason, as shown in the formula (6), in order to supply an appropriate transfer current to the toner portion, in consideration of an escape current, a difference (absolute value) between the voltage V1 and the voltage V2 is made larger than a difference (absolute value) between the voltage V2 and the voltage V3. The reason why the difference between the voltage V2 and the voltage V3 is made smaller than the difference between the voltage V1 and the voltage V2 is as follows. That is, different from the base of the patch void, the insufficient transfer is a phenomenon which occurs in a situation such that there is no escape current to the white portion and thus the current is supplied to an entire surface of the toner portion, so that increase and decrease in secondary transfer voltage lead to increase and decrease in current flowing through the toner portion as they are. Incidentally, the reason why the secondary transfer voltage is gradually changed in a section from A to B and a section from C to D is because when the secondary transfer voltage is discontinuously changed relative to the toner amount, there is a possibility that an appropriate secondary transfer voltage cannot be applied in the discontinuous toner amount.

Thus, in this embodiment, control is carried out so that a toner amount section in which the transfer voltage is substantially constant relative to the change in toner amount is patch void between the transfer voltage in the case where the toner amount of the toner used for the toner image is minimum and the transfer voltage in the case where the toner amount is maximum. In this embodiment, in the section of 0≤X≤A defined by the value A (0<A) of the above-described toner amount, the transfer voltage is substantially constant relative to the change in toner amount. Particularly, in this embodiment, the toner amount refers to a toner amount X [%} which is a ratio of a toner amount of the toner to be transferred onto the recording material P to a total amount of a toner amount for each of the colors of the toners capable of being transferred onto the recording material P. In the case where the toner amount X has the values A, B, C and D (0<A<B<C<D) which define the toner amount sections, when the section of 0≤X≤ is a section a, the section of A<X<B is a section b, the section of B≤X≤C is a section c, the section of C<X<D is a section d, the section of D≤X is an embodiment e, an average of transfer voltage absolute values in the section a is Vave1, an average of transfer voltage absolute values in the section c is Vave2, and an average of transfer voltage absolute values in the section e is Vave3, a relationship of Vave1>Vave2>Vave3 is satisfied. Further, in this embodiment, the value A is 3-10 [%], the value B is 15-25 [%}, the value C is 75-90 [%], and the value D is 95 [%] or more. Further, in this embodiment, (Aave1−Vave2)>(Vave2−Vave3) is satisfied. Further, in this embodiment, in the section a, the section c, and the section e, the transfer voltage is substantially constant relative to the change in toner amount X. Further, in this embodiment, in the section b and the section d, the absolute value of the transfer voltage gradually decreases with an increasing toner amount X. Incidentally, the reason why the above-described averages Vave1, Vave2 and Vave3 are employed is because as described later, the absolute value of the transfer voltage is capable of being changed in the section a, the section c, and the section e.

As described above, according to this embodiment, in the environment, such as the high-temperature/high-humidity environment, in which it is difficult to compatibly realize suppression of the patch void and suppression of the insufficient transfer, the secondary transfer voltage is set appropriately more than in the embodiment 1, so that a better transfer property can be obtained. Further, similarly as in the embodiment 1, in this embodiment, even in an environment other than the high-temperature/high-humidity environment, an appropriate secondary transfer voltage can be supplied by subjecting the secondary transfer voltage to the constant-current control. Accordingly, according to this embodiment, even when the image forming apparatus 100 is used in any environment in a usable range, good secondary transfer can be carried out.

In this embodiment, the four thresholds A, B, C and D of the toner amount X are provided, and the secondary transfer voltage is made substantially constant at the voltages V1, V2 and V3 in the sections of 0≤X≤A, B≤C, and D≤X (D)≤X≤400), respectively, in terms of the toner amount X, but the present invention is not limited thereto. For example, as shown in FIG. 10, the correction amount of the secondary transfer voltage relative to the toner amount X may be changed in the section of the toner amount X of 0≤X≤A (section a), the section of the toner amount X of B≤X≤C (section c), and the section of the toner amount X of D≤X (D≤X≤400) (section e). Of these sections a, c and e, in at least one section, the correction amount of the secondary transfer voltage relative to the toner amount X can be changed. Incidentally, in the constitution of this embodiment, other than the voltage V1, the voltage V4 in the toner amount C, the voltage V5 in the toner amount D, and the voltage in the section of the toner amount X of C≤X≤D can be considered as the reference value of the secondary transfer voltage.

First, as regards the low print-ratio printing, the patch void is liable to occur with a print ratio closer to the very low print ratio, and therefore, by increasing the absolute value of the secondary transfer voltage with a decreasing toner amount X, so that the patch void is readily suppressed. However, when the toner amount X is small (electric resistance is low), the transfer current becomes large, so that a load on the secondary transfer power source 21 becomes heavy. For that reason, in this embodiment, in view of the load on the secondary transfer power source 21, as shown in FIG. 9, the secondary transfer voltage was made substantially constant at the voltage V1 in the section of the toner amount X of 0≤X≤A. However, when there is an allowance in capacity of the secondary transfer power source 21, control such that the absolute value of the secondary transfer voltage is gradually increased from the toner amount X of A toward the toner amount X of 0% for an overall white image may be carried out.

Further, although there is a possibility that the isolated patch pattern and a pattern large in coating area by the toner exist in mixture in the section of the toner amount X of B≤X≤C, there is an increasing possibility that the page is coated with the toner with an increasing toner amount. For that reason, control such that the absolute value of the secondary transfer voltage is decreased gradually from the toner amount X of B toward the toner amount X of C may be carried out. Similarly, in the section of the toner amount X of D≤X (D≤X≤400), a possibility that the solid image such that an entire surface of the page is coated with the toner exists becomes higher with an increasing toner amount, so that the insufficient transfer is liable to occur. For that reason, in the section of the toner amount X of D≤X (D≤X≤400), the absolute value of the secondary transfer voltage may be gradually decreased with an increasing toner amount X.

Incidentally, the voltages V1, V2, V3, V4, V5 and V6 and the toner amounts A, B, C and D may be determined on the basis of the information on the recording material P and the environmental information similarly as in the above-described embodiment.

In this embodiment, in the section in which the absolute value of the secondary transfer voltage is changed relative to the change in toner amount X, the secondary transfer voltage is monotonously decreased linearly, but the present invention is not limited thereto, and correction with an arbitrary change ratio such that the secondary transfer voltage is changed in a curved shape may be made.

Further, another constitution of the embodiment 1 may be applied to the above-described constitution of this embodiment and another constitution of this embodiment or a combination of these constitutions.

Next, another embodiment of the present invention will be described. Basic constitution and operation of an image forming apparatus of an embodiment 3 are the same as those of the image forming apparatuses of the embodiments 1 and 2. Accordingly, in the image forming apparatus of the embodiment 3, as regards elements having the same or corresponding functions and constitutions as those in the image forming apparatuses of the embodiments 1 and 2, reference numerals or symbols which are the same as those in the embodiment 1 are added and detailed description thereof will be omitted.

This embodiment is a modified embodiment of the embodiment 1. In this embodiment, there is a section of the toner amount X in which the absolute value of the secondary transfer voltage is made substantially constant relative to the change in toner amount X in page.

FIG. 11 is a graph for illustrating the correction amount ΔV of the secondary transfer voltage in this embodiment. In FIG. 11, the abscissa represents the toner amount X in page, and the ordinate represents the secondary transfer voltage V which is actually applied. The toner amount X in page represented on the abscissa is capable of taking a value of 0-400 [%]. A voltage value in a section (section a) in which the toner amount X in page is 0≤X≤A [%] is V1. Further, a voltage value in a section (section c) in which the toner amount X is page is B≤X≤c is V2. Further, a voltage value in a section (section e) in which the toner amount X in page is D≤X≤E is V3. Further, a voltage value in a section (section g) in which the toner amount X in page is F≤X (F≤X≤400 [%]) is V4. Here, a relationship between V1, V2, V3 and V4 is V1>V2>V3 and V1>V4>V3.

This embodiment is different from the embodiment 2 in that the voltage V4 satisfying such a relationship is provided.

That is, in this embodiment, the absolute value of the secondary transfer voltage is increased in a part of the sections of the toner amount X while maintaining the relationship of V<V1. Incidentally, in this embodiment, the voltage V1 can be considered as the reference value of the secondary transfer voltage.

The voltages V1, V2 and V3 are set for the same purposes as those described in the embodiment 2. That is, the voltage V1 is set for the purpose of suppressing the patch void of the isolated patch pattern in the very low print-ratio printing. Further, the voltage V2 is set for the purpose of suppressing both the insufficient transfer and the patch void in the print amount of the medium level. Further, the voltage V3 is set for the purpose of suppressing the insufficient transfer of the secondary-color solid image from the monochromatic (single-color) solid image coated with the toner at an entire surface of the page.

Further, the voltage V4 applied in the section of the toner amount X of F≤X (F≤X≤400) is set for the purpose of suppressing the improper transfer in the case where the page is coated with a multiple-order color solid image which is not less than the secondary color solid image. This improper transfer occurs due to insufficient transfer current relative to a weight of toner to be transferred, and therefore, is liable to occur with an increasing weight of the toner. For that reason, in the case where the toner amount of the toner of the multiple color is increased, in order to suppress the improper transfer, the absolute value of the secondary transfer voltage is made larger than the secondary transfer voltage V3 for suppressing the insufficient transfer.

Further, a voltage value in a section of A<X<B (section b) is determined by linear interpolation between the voltage V1 and the voltage V2. Further, a voltage value in a section of C<X<D (section d) is determined by linear interpolation between the voltage V2 and the voltage V3. Further, a voltage value in a section of E<X<F (section 8) is determined by linear polarization between the voltage V3 and the voltage V4.

The voltages V1, V2, V3 and V4 and the toner amounts A, B, C, D, E and F in FIG. 11 may be determined on the basis of the information on the recording material P and the environmental information similarly as in the case of the embodiment 2.

Incidentally, values A, B, C, D, E and F may preferably fall within the following ranges. As regards the values A, B and C, similarly as in the embodiment 2, it turned out that it is preferable that the value A is 3-10% for suppressing the patch void, the value B is 15-20%, the value C is 75-90% for suppressing both the insufficient transfer and the patch void, and the value D is 95-140%. Further, as regards the values E and F for suppressing the improper transfer, it turned out that it is preferable that the voltage E is 210-240%, and the value F is 260% or more (and less than 400%).

Further, similarly as described in another constitution of the embodiment 2, the absolute value of the secondary transfer voltage can be changed in the sections a, c, e and g. In the section g, the absolute value of the secondary transfer voltage can be gradually increased with an increasing toner amount X. This is because the improper transfer is suppressed by increasing the absolute value of the secondary transfer voltage with the increasing toner amount of the toner such as the multiple color toner.

Thus, in this embodiment, the controller 210 carries out control so that when the transfer voltage is subjected to the constant-voltage control so that the voltage applied to the transfer member 20 by the applying portion 21 becomes substantially constant, the transfer voltage is a first voltage in the case where the toner amount of the toner used for the toner image is a first toner amount, is a second voltage smaller in absolute value than the first voltage in the case where the toner amount is a second toner amount larger than the first toner amount, and is a third voltage smaller in absolute value than the first voltage and larger in absolute value than the second voltage in the case where the toner amount is a third toner amount larger than the second toner amount. Specifically, in this embodiment, the toner amount refers to a toner amount X [%} which is a ratio of a toner amount of the toner to be transferred onto the recording material P to a total amount of a toner amount for each of the colors of the toners capable of being transferred onto the recording material P. In the case where the toner amount X has the values A, B, C, D, E and F ($0<A<B<C<D<E<F$) which define the toner amount sections, when the section of 0≤X≤ is a section a, the section of $A<X<B$ is a section b, the section of $B\leq X\leq C$ is a section c, the section of $C<X<D$ is a section d, the section of $D\leq X\leq E$ is a section e, the section of $E<X<F$ is a section f, the section of $F\leq X$ is an embodiment g, an average of transfer voltage absolute values in the section a is Vave1, an average of transfer voltage absolute values in the section c is Vave2, an average of transfer voltage absolute values in the section e is Vave3 and an average of transfer voltage absolute values in the section g is Vave4, a relationship of Vave1>Vave2>Vave3 and Vave1>Vave4>Vave3 are satisfied. Further, in this embodiment, the value A is 3-10 [%], the value B is 15-25 [%}, the value C is 75-90 [%], the value D is 95-140 [%], the value E is 210-240 [%], and the value F is 260 [%] or more. Further, in this embodiment, in the section a, the section c, the section e and the section g, the transfer voltage is substantially constant relative to the change in toner amount X. Further, in this embodiment, in the section b and the section d, the absolute value of the transfer voltage gradually decreases with an increasing toner amount X. Further, in this embodiment, in the section f, the absolute value of the transfer voltage gradually increases with an increasing toner amount X. Incidentally, the reason why the above-described averages Vave1, Vave2, Vave3 and Vave4 are employed is because as described later, the absolute value of the transfer voltage is capable of being changed in the section a, the section c, the section e and the section g.

As described above, in the case of the very low print-ratio printing, the voltage V1 for suppressing the patch void is applied. Further, in the case of the image coating the entire surface of the page, the voltage V3 for suppressing the insufficient transfer is applied. Further, in a print amount of about 20-100% which is not a low print ratio nor a high print ratio, the voltage V2 at which suppression of the insufficient transfer and suppression of the patch void are balanced is applied. By this, the respective image defects can be suppressed. Further, by applying the voltage V4 in the case of the multiple-color order high print-ratio image in which the toner amount is large in a height direction, the improper transfer due to insufficient transfer current in the high print-ratio printing can be suppressed. Thus, the image defects can be suppressed by selecting an appropriate voltage value in conformity to an associated image defect which can occur depending on the print amount.

Incidentally, in this embodiment, in the section in which the absolute value of the secondary transfer voltage is increased relative to the change in toner amount X, the secondary transfer voltage is monotonously increased linearly, but the present invention is not limited thereto, and correction with an arbitrary change ratio such that the secondary transfer voltage is changed in a curved shape may be made.

Further, another constitution of the embodiment 1 may be applied to the above-described constitution of this embodiment.

Next, another embodiment of the present invention will be described. In the image forming apparatus of an embodiment 4, as regards elements having the same or corresponding functions and constitutions as those in the image forming apparatuses of the embodiments 1, 2 and 3, reference numerals or symbols which are the same as those in the embodiments 1, 2 and 3 are added and detailed description thereof will be omitted.

The image forming apparatus of this embodiment is the image forming apparatus provided with no primary transfer power source. As a constitution in which the primary transfer power source is not provided, a drum voltage constitution described later in which primary transfer members are connected to the ground would be considered as an example. In this embodiment, the drum voltage constitution in which the primary transfer members are connected to the ground, an intermediary transfer belt used in the drum voltage constitution, and a functional effect in the case where the present invention is applied to the drum voltage constitution will be described. The image forming apparatus employing the drum voltage constitution in which the primary transfer members are connected to the ground refers to an image forming apparatus employing a high-voltage power source constitution as shown in FIG. 12. FIG. 12 is a schematic view showing a connection state and a grounding state of a high-voltage for respective portions around primary transfer portions N1 in the image forming apparatus 100 of this embodiment. In this embodiment, the primary transfer rollers 14 as the primary transfer members are connected to the ground (0 V) (electrically grounded). Further, in this embodiment, during image formation, to a core metal (not shown) of the photosensitive drum 1, a voltage of –300 V as a drum voltage (reference voltage) is applied from a high-voltage power source 200. On the surface of the photosensitive drum 1, an image forming potential V1 (−400 V) larger in absolute value than the drum voltage is formed. Then, by a difference (primary transfer contrast) between the potential (0 V) of the primary transfer roller 14 and the image forming potential V1 (−400 V) of the surface of the photosensitive drum 1, the toner on an image portion (portion of the image forming potential V1) of the photosensitive drum 1 is primary-transferred onto the intermediary transfer belt 10.

Next, the intermediary transfer belt 10 used in the drum voltage constitution will be described. As in this embodiment, in the constitution in which the primary transfer power source is not provided, it is difficult to increase the primary transfer contrast. In order to increase the primary transfer contrast, there is a need to increase the absolute value of the drum voltage, so that increases in size and cost of the image forming apparatus 100 are invited in some cases. For that reason, in order to cause a primary transfer current to flow sufficiently even in a small primary transfer contrast, it is preferable that an electric resistance of the intermediary transfer belt 10 is low.

FIG. 13 is a schematic view showing a cross-sectional structure of the intermediary transfer belt 10 in this embodiment. In this embodiment, as the intermediary transfer belt 10, an endless belt of 700 mm in circumferential length and 65 μm in thickness was used. Further, as shown in FIG. 13, in this embodiment, the intermediary transfer belt 10 has a two-layer structure consisting of a base layer 10*e* of 64 μm in thickness and an inner surface layer 10*f* of 1 μm in thickness. The intermediary transfer belt 10 contacts the photosensitive drum 1 on a base layer 10*e* side (outer peripheral surface side) and contacts the primary transfer roller 14 on an inner surface layer 10*f* side (inner peripheral surface side). In this embodiment, as a material of the base layer 10*e*, a polyethylene terephthalate (PET) resin material in which an ion-conductive agent is mixed as an electroconductive agent was used. Further, in this embodiment, as a material of the inner surface layer 10*f*, a polyester resin material in which carbon black which is an electron-conductive agent as the electroconductive agent is mixed was used. Incidentally, in this embodiment, as the material of the base layer 10*e*, the polyethylene terephthalate (PET) resin material was used, but another material can also be used. As a material of the base layer 10*e*, for example, materials such as polyester and acrylonitrile-butadiene-styrene (ABS) copolymer, and a mixed resin material of these materials can be used. Further, in this embodiment, as the material of the inner surface layer 10*f*, the polyester resin material was used, but another material can also be used. For example, an acrylic resin material may also be used.

In this embodiment, compared with the electric resistance of the base layer 10*e* of the intermediary transfer belt 10, the electric resistance of the inner surface layer 10*f* is made low. In this embodiment, volume resistivity of the intermediary transfer belt 10 is $1\times10^{10}$ Ω·cm. Further, in this embodiment, surface resistivity of the inner surface of the intermediary transfer belt 10 is $1.0\times10^{6}$ Ω/□. In this embodiment, a measuring environment of an electric characteristic of the intermediary transfer belt 10 is a room temperature of 23° C. and a room humidity of 50% RH. In this embodiment, between the base layer 10*e* and the inner surface layer 10*f*, from a relationship between the electric resistance and the thickness, the electric resistance value of the base layer 10*e* is reflected in volume resistivity actually measured for the intermediary transfer belt 10. On the other hand, the electric resistance value of the inner surface layer 10*f* is reflected in surface resistivity actually measured for the inner surface of the intermediary transfer belt 10.

Incidentally, the volume resistivity was measured by using a measuring device ("Hiresta-UP (MCP-HI450)", manufactured by Mitsubishi Chemical Holdings Corp.) provided with a ring probe ("Type UR (mode: MCP-HTP12). Further, the surface resistivity was measured using the same device, as the measuring device for the volume resistivity, provided with a ring probe ("Type UR100 (model: MCP-HTP16).

Measurement of the volume resistivity was measured under a condition such that the probe is applied to the intermediary transfer belt 10 from the outer surface side (base layer 10*e* side) and a voltage of 100 V is applied for 10 sec as a measuring time. Further, measurement of the surface resistivity was measured under a condition such that the probe is applied from the inner surface side (inner surface layer 10*f* side) and a voltage of 10 V is applied for 10 sec as a measuring time. In this embodiment, the volume resistivity of the intermediary transfer belt 10 may preferably be in a range of $1\times10^{9}$ Ω·cm or more and $1\times10^{10}$ Ω·cm, and the surface resistivity of the inner surface of the intermediary transfer belt 10 may preferably be in a range of $4.0\times10^{6}$ Ω/□ or less (typically, $1.0\times10^{5}$ Ω/□ or more).

The intermediary transfer belt 10 having the electric resistivity values as described above is low in electric resistance to the extent that the current is caused to flow through the intermediary transfer belt 10 in the circumferential direction, and therefore, even when the primary transfer contrast is small, the primary transfer current can be caused to sufficiently flow through the intermediary transfer belt 10. For that reason, as in this embodiment, in the drum voltage constitution provided with no primary transfer power source, a low-resistance intermediary transfer belt 10 having the electric resistance values as described above may preferably be used.

Next, the functional effect in the case where the present invention is applied to the above-described drum constitution will be described. In the high-temperature/high-humidity environment, with a lower electric resistance of the intermediary transfer belt 10 as in this embodiment, the secondary transfer current is liable to flow toward the white background portion, not the toner portion (patch portion). For example, in the case where the above-described images as shown in parts (a) and (c) of FIG. 6 are printed, as regards the secondary transfer portion N2, an equivalent circuit as shown in FIG. 14 can be considered. Reference symbols in FIG. 14 represents the following values.

Rr: electric resistance value of secondary transfer roller 20

Rp: electric resistance value of recording material P

Rt: electric resistance value of toner of isolated patch pattern

Ri: electric resistance value of intermediary transfer belt 10

I1: current passing through white background portion

I2: current passing through toner portion (patch portion)

A ratio of I1 to I2 is represented by the following formula (7).

$$I1/I2=(Ri+Rt+Rp)/(Ri+Rp)=1+Rt/Ri+Rp) \tag{7}$$

As shown in the formula (7), with a decreasing Ri, the ratio of I1 to I2 (I1/I2) becomes larger. That is, with the decreasing electric resistance value Ri of the intermediary transfer belt 10, the secondary transfer current is liable to flow toward the white background portion, not the toner portion (patch portion). For that reason, in the constitution using the above-described low-resistance intermediary transfer belt 10, in the image in which the toner amount is small, the patch void is liable to occur in some cases.

Therefore, in this embodiment, the present invention is applied to the constitution using the above-described low-resistance intermediary transfer belt 10. By this, similarly as in the above-described embodiments, to the image in which the toner amount is small such that the patch void occurs, the control in which the absolute value of the secondary transfer voltage is made larger with a smaller toner amount can be applied. As a result, even in the constitution using the above-described low-resistance intermediary transfer belt 10, it becomes possible to suppress the image defect such as the patch void. In addition, as described in the above-described embodiments, the insufficient transfer can also be suppressed. By this, as in this embodiment, a simple constitution with no primary transfer power source can be realized. Incidentally, as a secondary transfer voltage control method in this embodiment, either one of the control methods in the embodiments 1, 2 and 3 may be applied.

Thus, in this embodiment, the image bearing member 10 is constituted by the endless belt for conveying the toner image, primary-transferred from another image bearing member 1, for secondary transfer onto the recording material P, and the belt is capable of causing the current to flow in the circumferential direction. Further, in this embodiment, the volume resistivity of the belt is $1\times10^{9}$ Ω·cm or more and $1\times10^{10}$ Ω·cm or less.

As described above, according to this embodiment, even in the case where the low-resistance intermediary transfer belt 10 is used, by applying the control such that the absolute value of the secondary transfer voltage is made larger with the smaller toner amount, the patch void and the insufficient transfer can be suppressed. Accordingly, according to this embodiment, it is possible to suppress the patch void and the insufficient transfer while suppressing a simple constitution provided with no primary transfer power source.

As described above, the present invention was described based on the specific embodiments, but the present invention is not limited to the above-described embodiments.

For example, in the above-described embodiments, the image forming apparatus was the color image forming apparatus including a plurality of image forming portions, but the present invention is not limited thereto. The image forming apparatus may also be a monochromatic image forming apparatus including only one image forming portion. In this case, the present invention may only be required to be applied to a transfer portion where the toner image is directly transferred from a photosensitive member as the image bearing member onto a recording material.

According to the present invention, even under an environment, such as the high-temperature/high-humidity environment, in which it is difficult to compatibly realize the suppress of the patch void and the suppress of the insufficient transfer, it is possible to set an appropriate transfer voltage.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2021-099072 filed on Jun. 14, 2021, and 2022-050956 filed on Mar. 25, 2022, which are hereby incorporated by reference herein in their entirety.

What is claimed is:

1. An image forming apparatus comprising:

an image bearing member configured to bear a toner image;

a transfer member configured to form a transfer portion where the toner image is transferred from the image bearing member onto a recording material;

an applying portion configured to apply a transfer voltage to the transfer member;

a fixing unit configured to fix the toner image on the recording material;

an environmental sensor configured to detect an absolute water content;

a resistance detection unit configured to detect an index value correlated with an electrical resistance of the transfer portion; and a controller configured to control the transfer voltage for each recording material and to detect recording material information and information of the toner amount of the toner image, wherein, based on the recording material information and the information of the toner amount of the toner image, the controller controls the applying portion so as to subject the transfer voltage:

i) to constant current control so that a current supplied to the transfer member by the applying portion is substantially constant when the absolute water content indicated by a detection result of the environmental sensor is lower than a predetermined water content value, ii) to constant voltage control when the absolute water content indicated by the detection result of the environmental sensor is the predetermined water content value or higher, iii) to constant current control so that the current supplied to the transfer member by the applying portion is substantially constant when the electrical resistance of the transfer portion indicated by the index value of the resistance detection unit is lower than a predetermined resistance value, and iv) to constant voltage control when the electrical resistance of the transfer portion indicated by the index value of the resistance detection unit is equal to or greater than the predetermined resistance value.

2. The image forming apparatus according to claim 1, wherein the image bearing member is comprised of an endless belt for feeding the toner image, primary-transferred from another image bearing member, to be secondary-transferred onto the recording material at the transfer portion, and wherein the endless belt permits a flow of a current in a circumferential direction thereof.

3. The image forming apparatus according to claim 2, wherein a volume resistivity of the endless belt is $1\times10^{9}$ Ω·cm or more and $1\times10^{10}$ Ω·cm or less.

* * * * *